US007093668B2

(12) United States Patent
Gass et al.

(10) Patent No.: US 7,093,668 B2
(45) Date of Patent: *Aug. 22, 2006

(54) POWER TOOLS

(76) Inventors: Stephen F. Gass, 22409 SW. Newland Rd., Wilsonville, OR (US) 97070; David S. D'Ascenzo, 8643 SW. 19th Ave., Portland, OR (US) 97219

( * ) Notice: Subject to any disclaimer, the term of this patent is extended or adjusted under 35 U.S.C. 154(b) by 0 days.

This patent is subject to a terminal disclaimer.

(21) Appl. No.: 11/257,210

(22) Filed: Oct. 24, 2005

(65) Prior Publication Data
US 2006/0037766 A1 Feb. 23, 2006

Related U.S. Application Data

(60) Division of application No. 11/021,641, filed on Dec. 23, 2004, which is a continuation of application No. 10/385,215, filed on Mar. 10, 2003, now Pat. No. 6,834,730, which is a continuation of application No. 09/615,388, filed on Jul. 13, 2000, now Pat. No. 6,536,536, which is a continuation-in-part of application No. 09/302,162, filed on Apr. 29, 1999, now abandoned.

(60) Provisional application No. 60/149,944, filed on Aug. 19, 1999, provisional application No. 60/144,399, filed on Jul. 16, 1999.

(51) Int. Cl.
*B25B 31/12* (2006.01)
(52) U.S. Cl. .......................... 173/2; 173/20; 173/171; 173/217
(58) Field of Classification Search ............ 173/217, 173/2, 216, 171, 20, 176; 83/62.1, 58, 477.1, 83/477.2; 318/281, 282, 293; 379/902, 379/62, 150

See application file for complete search history.

(56) References Cited

U.S. PATENT DOCUMENTS

| | | |
|---|---|---|
| 3,079,510 A | 2/1963 | Hartwig |
| 3,371,257 A | 2/1968 | Warren et al. |
| 3,550,280 A | 12/1970 | Palm |
| 3,579,002 A | 5/1971 | Wickham |
| 3,757,194 A | 9/1973 | Weber et al. |
| 3,872,951 A | 3/1975 | Hastings, Jr. |
| 3,921,298 A | 11/1975 | Fattaleh |
| 3,999,110 A | 12/1976 | Ramstorm et al. |
| 4,063,600 A | 12/1977 | Krzes |
| 4,161,242 A | 7/1979 | Moores, Jr. et al. |
| 4,307,325 A | 12/1981 | Saar |
| 4,317,176 A | 2/1982 | Saar et al. |
| 4,324,512 A | 4/1982 | Siroky |
| 4,358,230 A | 11/1982 | Rohlin |
| 4,381,037 A | 4/1983 | Cuneo |
| 4,389,146 A | 6/1983 | Coder |
| 4,412,158 A | 10/1983 | Jefferson et al. |
| 4,486,176 A | 12/1984 | Tardieu et al. |
| 4,503,370 A | 3/1985 | Cuneo |
| 4,523,116 A | 6/1985 | Dibbern, Jr. et al. |
| 4,567,952 A | 2/1986 | Lemaire et al. |
| 4,683,682 A | 8/1987 | Pennison |
| 4,689,534 A | 8/1987 | Gerber et al. |
| 4,720,897 A | 1/1988 | Orrell et al. |
| 4,779,687 A | 10/1988 | Schreiber et al. |

(Continued)

OTHER PUBLICATIONS

*American Woodworker*, Issue No. 62, pp. 68-75, Nov. 1997.

(Continued)

*Primary Examiner*—Scott A. Smith

(57) ABSTRACT

An electrically powered hand tool is disclosed. The tool includes a motor, a power source, a work element and a controller. Various alternative features, embodiments and operative configurations are disclosed.

20 Claims, 15 Drawing Sheets

U.S. PATENT DOCUMENTS

| | | |
|---|---|---|
| 4,808,862 A | 2/1989 | Carvalho et al. |
| 4,835,410 A | 5/1989 | Bhagwat et al. |
| 5,117,919 A | 6/1992 | Borries et al. |
| 5,165,488 A | 11/1992 | Liu |
| 5,247,580 A | 9/1993 | Kimura et al. |
| 5,251,706 A | 10/1993 | Evans |
| 5,255,326 A | 10/1993 | Stevenson |
| 5,267,323 A | 11/1993 | Kimura |
| 5,354,215 A | 10/1994 | Viracola |
| 5,365,155 A | 11/1994 | Zimmermann |
| 5,440,215 A | 8/1995 | Gilmore |
| 5,458,206 A | 10/1995 | Bourner et al. |
| 5,563,482 A | 10/1996 | Shaw et al. |
| 5,619,085 A | 4/1997 | Shramo |
| 5,624,000 A | 4/1997 | Miller |
| 5,662,174 A | 9/1997 | Vermilyer |
| 5,704,433 A | 1/1998 | Bourner et al. |
| 5,715,156 A | 2/1998 | Yilmaz et al. |
| 5,718,014 A | 2/1998 | deBlois et al. |
| 5,749,072 A | 5/1998 | Mazurkiewicz et al. |
| 5,754,019 A | 5/1998 | Walz |
| 5,774,859 A | 6/1998 | Houser et al. |
| 5,796,188 A | 8/1998 | Vays |
| 5,798,584 A | 8/1998 | Schaeffeler et al. |
| 5,809,471 A | 9/1998 | Brodsky |
| 6,005,489 A | 12/1999 | Siegle et al. |
| 6,042,310 A | 3/2000 | Campbell et al. |
| 6,186,248 B1 | 2/2001 | Silay et al. |
| 6,196,554 B1 | 3/2001 | Gaddis et al. |
| 6,224,304 B1 | 5/2001 | Smith et al. |
| 6,536,536 B1 * | 3/2003 | Gass et al. ............... 173/2 |
| 6,822,584 B1 * | 11/2004 | Scheib ............... 341/22 |
| 6,834,730 B1 * | 12/2004 | Gass et al. ............... 173/2 |
| 6,971,454 B1 * | 12/2005 | Bogue ............... 173/2 |
| 6,994,004 B1 * | 2/2006 | Gass et al. ............... 83/62.1 |

OTHER PUBLICATIONS

Metabo Power Tools and Abrasives catalog, 1997.
*A Cordless Drill Made to be Held, Fine Woodworking*, No. 136, p. 32, Jun. 1999.
*Five Bits in One, Popular Science*, vol. 253, No. 6, p. 59, Dec. 1998.
SKIL® advertisement, *Popular Science*, vol. 253, No. 6, p. 421, Dec. 1998.
*Metabo Product design*, screen display from Metabo website, www.metabo.com, 1999.
*Metabo the Generation*, screen display from Metabo website, www.metabo.com, 1999.

* cited by examiner

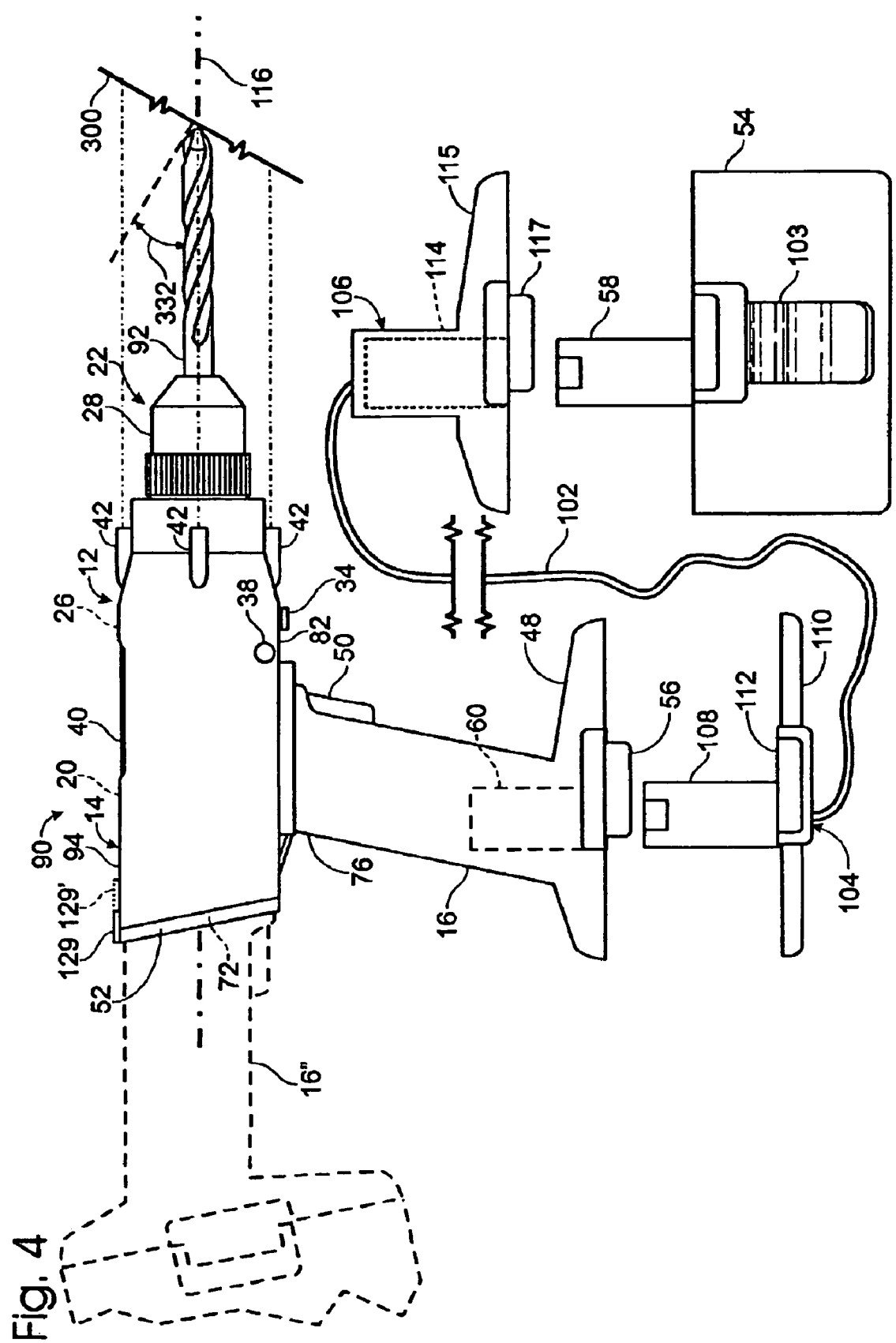

POWER TOOLS

CROSS-REFERENCE TO RELATED APPLICATIONS

This application is a divisional of U.S. patent application Ser. No. 11/021,641, filed Dec. 23, 2004, pending which is a continuation of U.S. patent application Ser. No. 10/385,215, filed Mar. 10, 2003, issued as U.S. Pat. No. 6,834,730 on Dec. 28, 2004, and which is a continuation of U.S. patent application Ser. No. 09/615,388, filed Jul. 13, 2000, issued as U.S. Pat. No. 6,536,536 on Mar. 25, 2003, which is a continuation-in-part of U.S. patent application Ser. No. 09/302,162, filed Apr. 29, 1999, now abandoned which is based upon and claims priority from U.S. Provisional Patent Application Ser. No. 60/144,399, filed Jul. 16, 1999 and U.S. Provisional Patent Application Ser. No. 60,149,944, filed Aug. 19, 1999. The complete disclosures of all of the above applications are hereby incorporated by reference for all purposes.

FIELD OF THE INVENTION

The invention relates generally to hand tools, and more particularly to electrically powered hand tools.

BACKGROUND OF THE INVENTION

Many hand tools that in the past were purely mechanical are now being replaced by motorized hand tools that perform the same function more quickly and with less effort by the user. Examples of conventional electrically powered hand tools are screwdrivers, drills, routers, sanders and a variety of saws, such as jigsaws, reciprocating saws and circular saws.

Existing hand tools suffer from a number of deficiencies. For instance, hand tools, by their very nature are portable and thus easily stolen from job sites or storage areas. With battery powered tools, the weight of the tool is often excessive for comfortable extended use. Conventional electrically powered tools also do not allow the user to optimize the tool for use with the particular user's preferences, or with the specific requirements of a particular project or operating condition. For example, many tools are not adequately flexible in their operation to accommodate particular tasks easily and conveniently. By way of example, drill/drivers are used to drill holes and drive screws, however, existing designs do not always accomplish these functions in the most efficient or reliable matter. When driving screws, for instance, it is often difficult to accurately control the depth of the screw with existing drills. Similarly, existing drills do not provide sufficient control of torque, speed and/or number of revolutions. In some applications, the physical configuration of the drill is not well suited to allow access to the work sites. Various embodiments of the present invention address one or more of these and other deficiencies.

Many features of the present invention will become manifest to those versed in the art upon making reference to the detailed description which follows and the accompanying sheets of drawings in which preferred embodiments incorporating the principles of this invention are disclosed as illustrative examples only.

BRIEF DESCRIPTION OF THE DRAWINGS

FIG. 4 is a side elevation view of another embodiment of a hand tool constructed according to the present invention.

DETAILED DESCRIPTION OF THE PREFERRED EMBODIMENTS AND BEST MODE OF THE INVENTION

Figure 1:
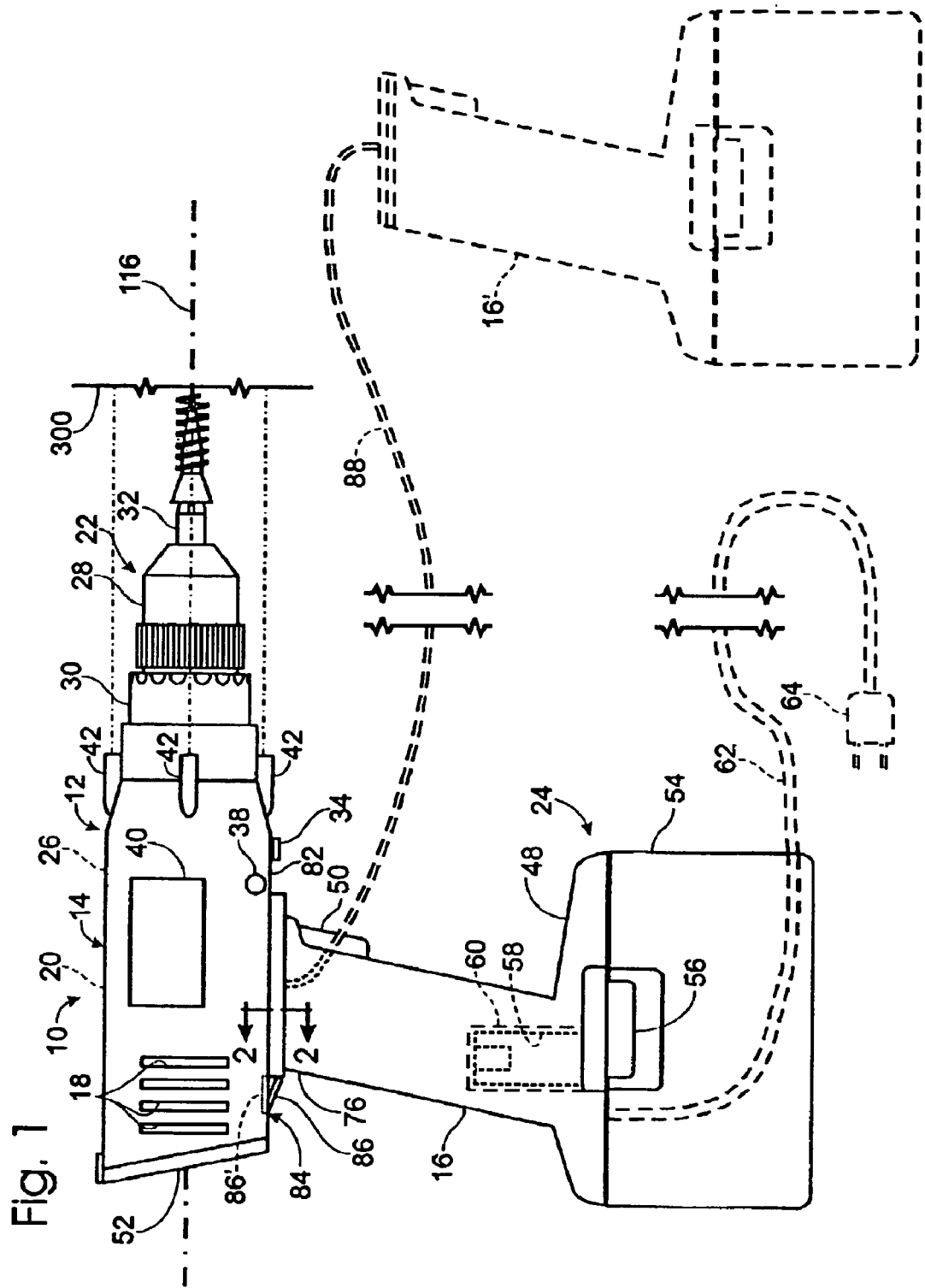
FIG. 1 is a side elevation view of a hand tool constructed according to the present invention.

An electrically powered hand tool constructed according to the present invention is shown in FIG. 1 and generally indicated at 10. Tool 10 includes a body 12 with a housing 14, a handle 16 and a plurality of vents 18 for providing ventilation and cooling to a motor 20, which is contained within the housing. Tool 10 further includes a work element 22 in the form of a keyless chuck 28, a power source 24, a controller 26 and a manual clutch, or torque control, 30. Work element 22 is adapted to receive a bit, such as the screwdriver bit shown in FIG. 1 at 32 and is connected to a drive-train (not shown) such as is well known in the art. Examples of suitable torque control and drive-train mechanisms are disclosed in U.S. Pat. Nos. 4,161,242, 5,440,215, 5,458,206, 5,624,000 and 5,704,433, the disclosures of which are hereby incorporated by reference.

Also shown in FIG. 1 is a reversing switch 34 that selectively reverses the direction in which the motor rotates the work element. Tool 10 also includes a user input in the form of a user-input button 38, a user interface 40 and a plurality of distance sensors 42. Controller 26 controls the operation of tool 10. This includes regulating the supply of power to motor 20, responding to signals from user inputs and sensors, and controlling the output on user interface 40. The features and operation of controller 26, user-input button 38, user interface 40 and distance sensors 42 will be described in more detail below.

As shown, tool 10 is a battery-powered hand drill, however, it is within the scope of the present invention that hand tool 10 could also be in the form of a screwdriver, right angle drill, hammer drill or other known types of drills and drivers. For certain aspects of the present invention, the tool could also be a saw, router, sander or other form of powered hand tool. For example, when tool 10 is a reciprocating saw, work element 22 includes an arbor with a blade; when tool 10 is a router, work element 22 includes a collet with a router bit; when tool 10 is a sander, work element 22 includes a sanding head or a pad for receiving sandpaper; and when tool 10 is a jigsaw, work element 22 includes a blade holder to receive a jigsaw blade.

As shown in FIG. 1, handle 16 extends from body 12 and terminates at a base 48 away from body 12. Handle 16 includes a trigger, or actuator, 50 that is selectively depressed by a user to actuate the tool. As shown, handle 16 extends from body 12 forward of the body's rear portion 52 in a configuration known as a T-handle configuration. Other shapes and orientations of handle 16 are possible, such as a pistol grip configuration.

In FIG. 1, power source 24 includes a battery 54, which preferably is a rechargeable battery. Battery 54 is coupled to base 48 of handle 16 by at least one (typically two) clips 56, which selectively retain the battery in contact with handle 16. By disengaging clips 56, battery 54 may be selectively removed from the tool, such as to recharge the battery. As shown, battery 54 includes a terminal portion 58 that is inserted within a corresponding receptacle 60 within the handle to deliver electrical power to the tool.

As shown in dashed lines in FIG. 1, power source 24 may additionally, or alternatively, take the form of a power cord 62 with a plug 64 that may be plugged into an electrical outlet to provide power to the tool. Regardless of whether power source 24 includes a battery or a power cord adapted to be inserted into an electrical socket, tool 10 is still a portable hand tool. By this it is meant that the tool is transported and supported by hand and applied to a stationary work piece, as opposed to tools, such as a table saw or drill press, which are supported by a stationary base and relative to which a work piece is moved. Put another way, typically with a portable hand tool, as used herein, the tool is brought to the work, rather than the work being brought to the tools.

Handle 16 may be integrally formed with or otherwise fixedly secured to housing 14 in a mounting position in which the handle extends generally transverse to the axis of work element 22. This is the traditional mounting position for powered hand drills and drivers. In the embodiment shown in FIG. 1, however, the handle may also be selectively removed the housing. For example, in FIG. 1, the handle is shown in dashed lines detached from housing 14. In this detached configuration, the handle is generally indicated at 16'. For purposes of clarity, the handle will be referred to as handle 16 when in its transverse, or traditional mounting position, handle 16' when in its detached mounting position, and handle 16" when in its subsequently referred to axial mounting position. Regardless of the mounting position and reference numeral, it should be understood that unless otherwise specified the components and subcomponents of the handle are the same.

When the handle is selectively removable from housing 14, tool 10 includes a fastening mechanism 70 that is adapted to secure the handle to the body and selectively release the handle therefrom. Examples of suitable fastening mechanisms include screws, threads, clips, slide locks, snap locks, deformable fasteners, etc., provided that the fastening mechanism enables the handle to be selectively detached and reattached to housing 14. It should be understood that as used herein, the term "removable" refers to a handle that may be separated from body 12 without destroying or impairing the operability of the tool. Instead, only manipulation or removal of the fastening mechanism (or selected components thereof) is required.

Figure 2:
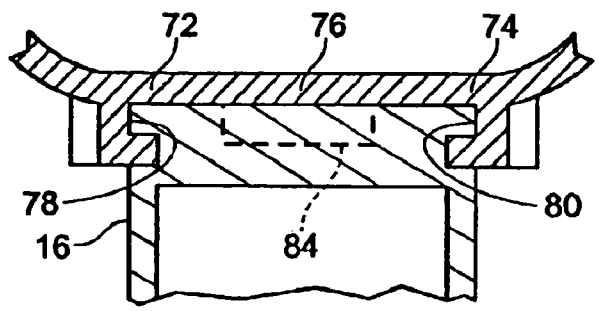
FIG. 2 is a fragmentary cross-sectional detail taken along the line 2—2 in FIG. 1 and showing a fastening mechanism coupling the handle to the body of the tool.

One example of a suitable fastening mechanism 70 is shown in FIG. 2. As shown, handle 16 includes lips 72 and 74 that extend outwardly on each side of the handle's upper portion 76. As shown, lips 72 and 74 diverge from each other as they extend generally away from actuator 50 to provide a wedge-like, or dovetail, configuration. Lips 72 and 74 are received within corresponding tracks 78 and 80 in the lower portion 82 of body 12. Tracks 78 and 80 generally correspond to the shape of lips 72 and 74. Once positioned within the tracks, a retainer 84 is manually or automatically positioned to at least partially obstruct the removal of lips 72 and 74, thereby preventing the unintentional removal of handle 16 from body 12.

As shown, retainer 84 includes a deformable member 86 that normally projects away from body 12 and is at least partially within a plane defined by tracks 78 and 80. As lips 72 and 74 are inserted into the tracks, member 86 is urged toward body 12 and out of the plane of the tracks, as shown in dashed lines at 86' in FIG. 1. However, once the handle is in its mounting position, member 86 is biased to return toward its original, unbiased position and thereby prevent removal of the handle until a user intentionally urges the member back to its deformed position so that the handle may be removed.

While not essential to the present invention, a tapered configuration of lips 72 and 74 assists in the secure positioning of handle 16 on body 12. Once the lips are inserted within the tracks beyond a certain point, the distance between opposing portions of tracks 78 and 80 is the same as the distance between the region of lips retained therebetween, thereby preventing the lips from being inserted any further within the tracks. The wedge-shaped, or divergent, configuration of lips 72 and 74 shown in FIG. 2 is one suitable configuration. The lips may extend in other orientations as well, such as convergent and parallel to each other. Other suitable fastening mechanisms also may be used.

A benefit of a fastening mechanism with tracks and a deformable retainer is that it does not require additional tools and does not involve removable parts which may be lost, such as when screws or other removable fasteners are used. Nonetheless, such removable fasteners are still within the scope of the invention. Another suitable fastening mechanism is a plurality of deformable clips that are spaced around and thereby define therebetween a mounting position for the handle on body 12. Any other suitable fastening mechanism may be used, and the above examples are merely presented as illustrative examples of suitable fastening mechanisms.

While detached from housing 14, handle 16' remains in electrical communication with the rest of tool 10 via a cable 88. Besides maintaining electrical communication between the power source (i.e. battery 54') and motor 20, cable 88 also provides communication between the tool's actuator 50 and controller 26. Therefore, cable 88 will generally include multiple wires or other suitable communication lines. For example, a pair of wires may be used to provide electrical power between the battery and the rest of the tool, while typically at least one other wire is used to provide communication between the actuator and the controller.

Preferably cable 88 is of a sufficient length to permit a user to position housing 14 in an operative position with one hand, while having handle 16' and battery 54 supported in a spaced-relationship from body 12, such as in the user's other hand. A cable of at least two feet is generally sufficient, with cables of between three and eight feet being preferred. Of course, depending upon the particular operating conditions and a particular user's preferences, it is within the scope of the invention that cables outside of this range may be used. When not being used or when not fully extended from handle 16', cable 88 may be stored within the handle. Alternatively, the cable may be detachable for separate storage within the drill or elsewhere. A relatively short cable may be used when handle 16 mounted directly to body 12 and only repositioned between its traditional and axial mounting positions. When a user desires to use the handle in its detached position, this shorter cable is detached and cable 88 reattached in its place.

Figure 3:
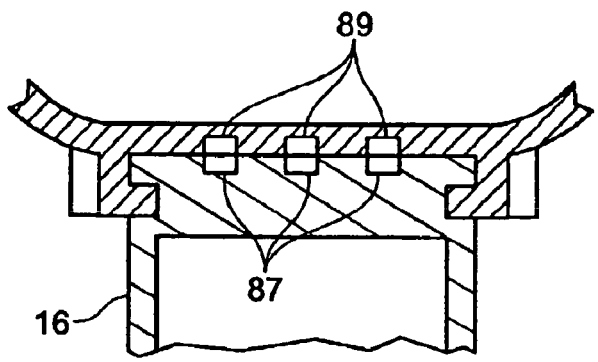
FIG. 3 is the detail of FIG. 2 showing an alternate method of providing electrical communication between the handle and the body of the tool.

When handle 16 is in its standard or axial mounting position, electrical communication between the handle and the rest of the tool alternatively may be established by paired contacts in the upper region 76 of the handle and in the corresponding portion of body 12 to which the handle is mounted. An example of such a connection between the handle and body portions of the tool is shown in FIG. 3, in which contacts 87 engage corresponding contacts 89 when the lips are received within the tracks. With this configuration, cable 88 would typically detachably engage the contacts.

Because tool 10 enables a user to support the weight of battery and handle separate from the weight of the rest of the tool, it reduces the strain upon a user when the tool must be used for more than a short time period. Anyone who has used a battery-powered drill with an 18-volt battery for an extended period of time will appreciate the advantages of such an operative configuration. Similarly, users that lack the strength to lift and properly position a conventional battery-powered tool will find this feature beneficial. In addition, detaching the handle and battery also permits the work element of the tool to reach tight areas that otherwise would be inaccessible if the handle and battery were not detachable.

Figure 8:
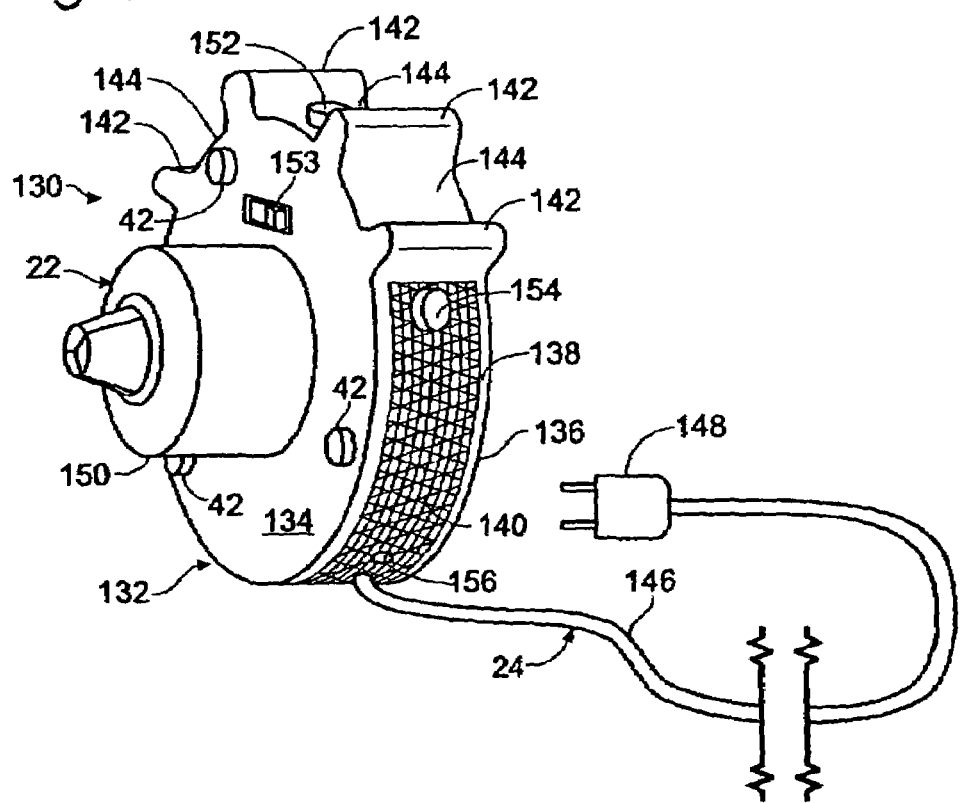
FIG. 8 is an isometric view of another embodiment of a hand tool constructed according to the present invention.

To facilitate a user maintaining a firm grip on housing 14 when the tool is used with the handle in its detached position, housing 14 may include a grippable region adapted to provide the user with a more secure grasp of the housing. Additionally, the housing may be of any suitable ergonomic shape to provide the user with a better grip. For example, the housing may have a non-circular cross-sectional configuration transverse to the long axis of the housing, or it may include ergonomic recesses or protrusions into which a user's fingers or palm may be received when the housing is gripped. Examples of user-grippable regions and ergonomic shapes are shown in FIG. 8, which is discussed in more detail subsequently.

Another embodiment of a hand tool constructed according to the present invention is shown in FIG. 4 and generally indicated at 90. Unless otherwise indicated, tools 10 and 90 have the same components, subcomponents and possible variations, and to that effect, the same reference numerals will be used where possible. Similar to tool 10, tool 90 includes a body 12 with a housing 14, handle 16, motor 20 and work element 22. Unlike the embodiment of the tool shown in FIG. 1, tool 90 does not include a manual torque control for its motor. Instead, tool 90 includes electronic torque control that is regulated by controller 26 responsive to user inputs and signals from sensors. It should be understood that a tool according to the present invention may include both mechanical and electronic torque control. Also, instead of the screwdriver bit 32 shown in FIG. 1, another example of a suitable bit, namely drill bit 92, is illustrated in FIG. 4.

Figure 5:
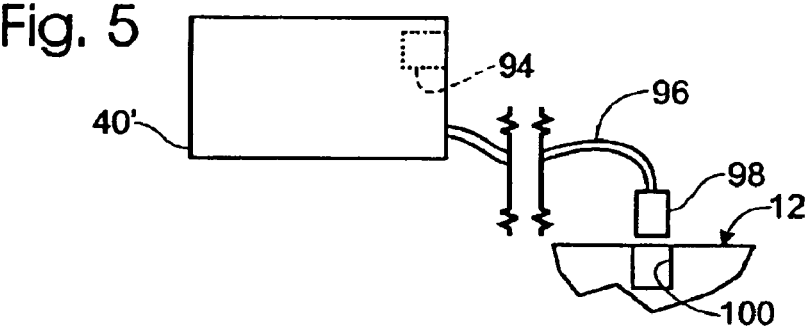
FIG. 5 is an elevation view of an alternate embodiment of the user interface shown in FIGS. 1 and 4.

In FIG. 4, user interface 40 is shown mounted on the top portion 94 of the housing, instead of the position on the side of the housing shown in FIG. 1. It is within the scope of the position that user interface 40 may be mounted in any suitable location on the tool, and the positions shown in FIGS. 1 and 4 are merely presented to illustrate two suitable mounting positions. It is also within the scope of the present invention that the user interface may be separable from the body of the tool, such as shown in FIG. 5. In FIG. 5, the user interface is generally indicated at 40'. In this embodiment, user interface 40' may communicate with the controller via a wireless signal from a transmitter/receiver 94, which is shown in dashed lines. For example, transmitter/receiver 94 may communicate with the controller via infrared signals. Alternatively, user interface 40' may communicate with the controller via a physical communication line, such as a cable 96 which extends from the user interface and includes a plug 98 that couples to an outlet 100 positioned in any suitable location on the body 12 of the tool. The user interface may even have a socket on the drill body adapted to receive a portion of the interface. A remote-computing device, such as a desktop, laptop, or hand-held computer, may also be used to transmit user inputs to controller 26. When the interface is selectively or permanently detached from the body of the tool, the interface may include its own power supply so that the interface may transmit signals to the controller when detached therefrom.

In FIG. 4, it can be seen that housing 14 does not include any vents. This reduces the chance of water or other contaminants entering the housing. In fact, housing 14 is may be completely sealed so as to be waterproof and thereby prevent water or other fluid or solid contaminants from entering the housing. Alternatively, only the electrical components may be waterproof so that water may enter the housing without damaging the tool. When a water-resistant or waterproof embodiment of the tool is used, trigger 50 preferably, but not necessarily, includes a non-mechanical pressure sensor, such as a piezoelectric, semiconductor, resistive, capacatative or inductive strain gauge transducer or sensor, instead of a traditional rheostat-type control. The advantage of this is that because the actuator does not include exposed moving electrical parts, it also does not include seams or cracks between adjacent members through which water or other contaminants may enter and potentially damage the tool. Thus, a solid-state transducer may be more easily sealed against entry of water. Examples of suitable triggers are disclosed in U.S. Pat. No. 5,365,155, the disclosure of which is hereby incorporated by reference.

Preferably, the contacts between the battery and body of the drill should be sealed to prevent contamination and shorting by water. For instance, the battery may be housed in a watertight container with only a hole leading to the contact sockets exposed. The corresponding contacts in the handle are insulated except for the end that is received in the sockets. Then, as the contacts pass through the hole leading to the sockets, the hole is sealed and water is prevented from entering. Of course, other waterproof connectors as are known in the art may also be used.

Figure 27:
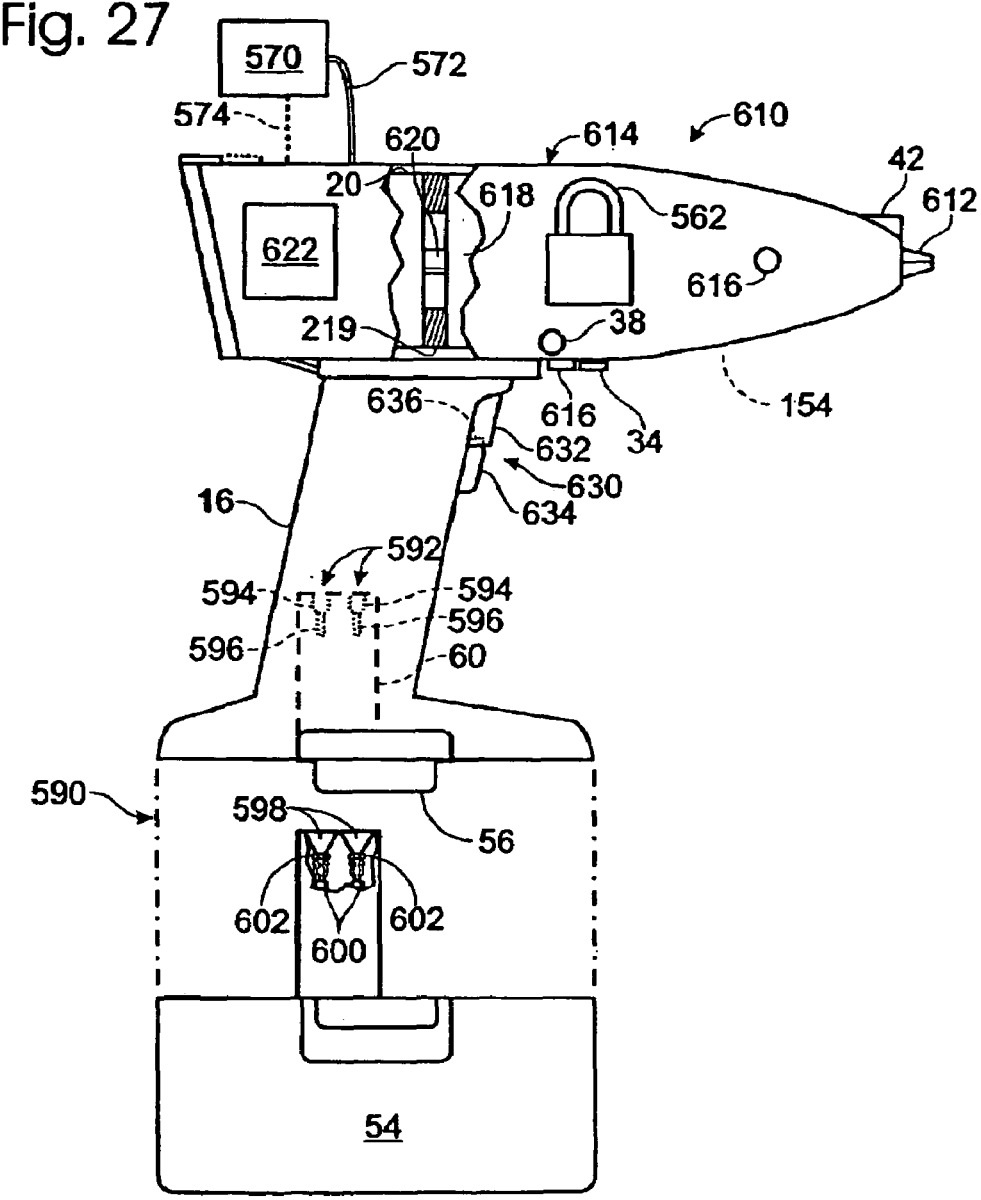
FIG. 27 is a side elevation view showing another embodiment of a hand tool constructed according to the present invention.

An example of such a battery connection is shown in FIG. 27 and generally indicated at 590. As shown, handle 16 includes a pair of contacts 592 that include waterproof insulation 594 extending along a portion of their length toward the body of the tool, with the tips 596 of the contacts exposed. Tips 596 are received within corresponding passages 598 on battery 54 and into electrical communication with a corresponding pair of contacts 600. As shown, passages 598 include a pair of seals 602, such as rubber o-rings. The engagement of insulation 594 and seals 602 prevents water or other liquids from passing through the passages.

When such a sealed housing is used, it is preferable that motor 20 is a brushless motor so that it will not generate the particulate and heat generated by conventional motors with brushes that tend to wear out over time. For example, the motor may be a poly-phase motor, such as a three-phase motor. Of course, a poly-phase motor also may be used when the tool includes a vented housing. Other advantages of a three-, or poly-phase, brushless motor over a standard motor with brushes include greater reliability, easier electrical sealing, a wider range of power, decreased maintenance, increased efficiency, electronic reversing, no sparking (which can be important in environments in which potentially explosive gasses are present), less required gearing to reach a low rpm, and a wider rpm range. It should be understood that these advantages are presented to identify, in a non-limiting manner, advantages of one possible motor over the standard motor used in electrically powered hand tools. However, both of these and other types of motors may be used within the scope of the present invention, and it is possible that not each of the advantages are realized with a particular embodiment of such a motor.

A variation of cable 88 is shown in FIG. 4 and generally indicated at 102. Cable 102 enables battery 54 to be detached from the tool, while still remaining in electrical communication therewith. In operation, cable 102 functions much like an extension cord, in that it enables battery 54 to be positioned apart from body 12, while retaining the electrical communication therebetween. By having the weight of the battery separate from the weight of the rest of the tool, the battery may be supported or otherwise positioned in an out-of-the-way position, while the rest of the tool is operated by the user. For example, the battery may be clipped to the user's belt, placed in the user's pocket, or supported on the ground or other adjacent surface, instead of having to be supported along with the rest of the tool. For example, a clip for attaching the battery to the user's belt, pants, tool belt or other suitable garment is indicated generally at 103. As described above in the context of the detachable handle, reducing the weight of the operative portion of the tool is advantageous. In addition, by mounting the battery away from the tool, a larger battery can be accommodated without increasing the weight of the tool unacceptably.

Cable 102 includes a pair of ends 104 and 106. End 104 includes a terminal portion 108, much like terminal portion 58, which is sized to be received within receptacle 60 of handle 16 and to transmit electrical power thereto. As shown, end 104 further includes a cover plate 110 with one or more receivers 112 that are selectively engaged by clips 56 to retain the cover plate against the base 48 of handle 16. The other end 106 includes a receptacle 114 that is sized to removably receive the terminal portion of the battery. As shown, end 106 further includes a cover plate 115 that selectively couples to battery 54, such as with clip 117. When both ends 104 and 106 are coupled respectively to the receptacle and terminal portion, the battery is in electrical communication with the motor and other components of the tool.

Figure 6:
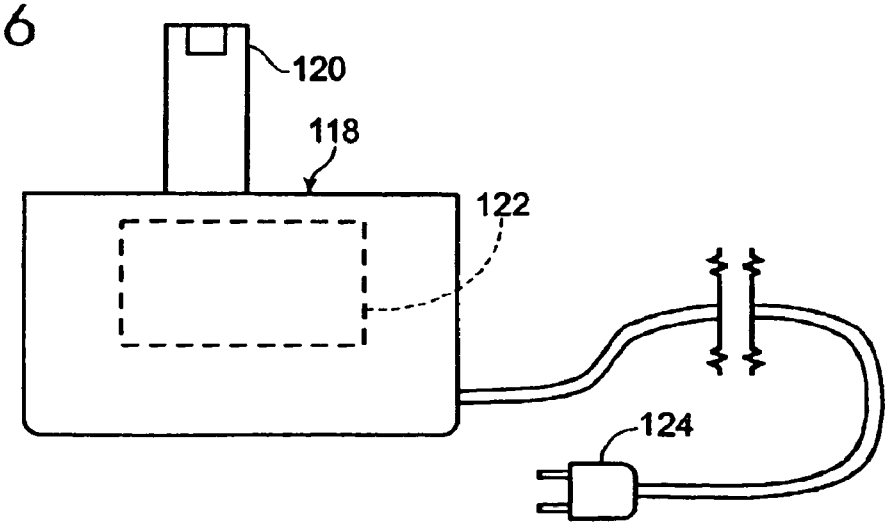
FIG. 6 is a side elevation view of a power supply adapted for use with the invented hand tool.

In a further variation of this embodiment, tool 90 may be selectively adapted to be powered by either a battery or an electrical outlet. To adapt tool 90 to receive power from an electrical outlet, tool 90 may be selectively coupled to a power supply, such as shown in FIG. 6. Supply 118 includes a terminal 120 sized to be selectively coupled to end 106 of cable 102 or receptacle 60 of handle 16. Supply 118 further includes a transformer 122 that is adapted to convert power from an electrical outlet to the voltage and current normally received from battery 54. Alternatively, the tool can be provided with internal or attachable circuitry to step-down the line voltage to a standard battery voltage. Supply 118 further includes a conventional electrical plug 124 that provides power to tool 90 when inserted into an electrical outlet. Other suitable forms of plugs and electrical connections may be used to connect supply 118 with the tool.

In FIG. 4, an alternative mounting position for handle 16 is shown. Instead of the traditional, or standard, mounting position in which the handle extends generally transverse to the long axis 116 of body 12, as shown in FIG. 1, the handle may selectively extend generally along the axis, as shown in FIG. 4. In this axial mounting position, the handle is generally indicated at 16", and it extends rearwardly from the rear portion 52 of body 12. To secure the handle to this axial mounting position, tool 90 includes a similar fastening mechanism 70 proximate its rear portion 52. For example, as shown in FIG. 4, portion 52 includes a pair of tracks 126 and 128, which define a slot into which lips 72 and 74 of the handle may be selectively inserted.

It should be understood that the passages, or slots, defined by tracks 126 and 128 and tracks 78 and 80 both should be sized to permit the lips of the handle to be inserted and selectively retained therein. By this it is meant that the rear portion 52 of the body will generally include the same shape and configuration of tracks, deformable clips, terminals or other sockets, etc. as used on the lower portion of the body. Therefore, the handle can be selectively positioned between either the transverse mounting position shown in FIG. 1 at 16, a detached position, such as shown in FIG. 1 at 16', or the axial mounting position shown in FIG. 4 at 16".

It should be understood that portions of the fastening mechanism may have different sizes and shapes selected because of the differences in size of rear portion 52 compared to lower portion 82. For example, a retainer for the axial mounting position is generally indicated at 84' and in this embodiment includes a spring-loaded slide 129. From the starting position shown in solid lines in FIG. 4, a user may selectively urge the slide in the direction of work element 22, such as to the position indicated in dashed lines at 129'. In this position, slide 129 is removed from obstructing the path of lips 72 and 74 into the corresponding tracks of rear portion 52. Once the handle is inserted into its axial mounting position, the user releases the slide, and it returns to its starting position, thereby preventing the unintentional removal of the handle. Other suitable manual and biased retainers may be used and are within the scope of the present invention.

As shown in FIG. 4, rear portion 52 is inclined relative to long axis 116 so that handle 16" extends generally along the axis when the handle is in its axial mounting position. It is within the scope of the present invention that other shapes for handle 16 and rear portion 52 may be used. For example, the end portion may extend transverse to the long axis so that the handle extends at an angle with respect to axis 116. Similarly, it is also possible that the handle may be oriented so that it would extend generally along axis 116 when rear portion 52 has such a transverse orientation. Other shapes and configurations are also possible, such as a hinged handle that selectively pivots or slides to any of a range of positions between the traditional and axial positions.

For example, a single pair of arcuate tracks may extend between and including the positions of the tracks shown in FIGS. 1 and 4. Lips 72 and 74 may be similarly curved to correspond to the shape of the tracks and thereby be selectively positioned in the traditional or axial position, as well as anywhere therebetween along the arcuate path of the tracks. In such a configuration, the rear portion of the housing should be shaped so that it does not obstruct the slidable movement of the handle along this curved path.

Figure 7:
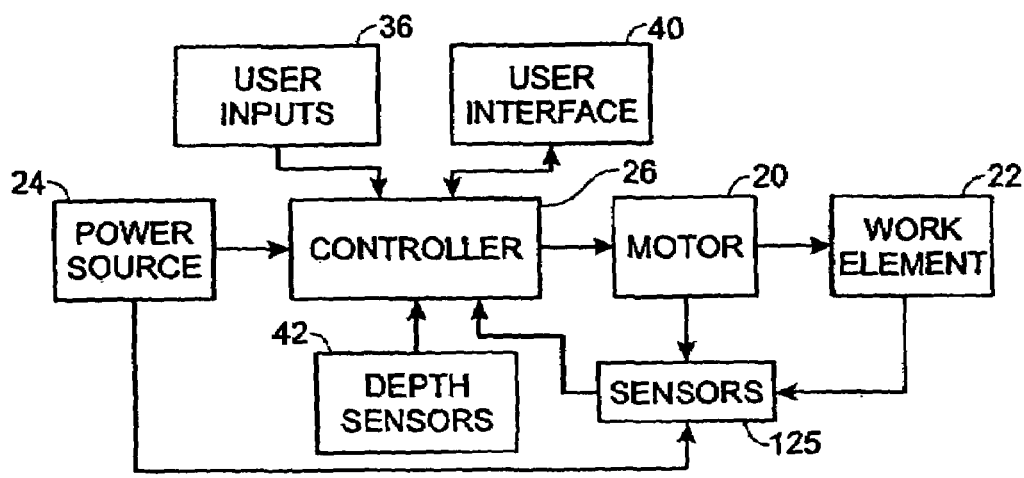
FIG. 7 is a schematic diagram showing the communication between various components of the invented hand tool.

Turning now to FIG. 7, a representative block diagram of the components of drills 10 and 90 is shown. In the diagram, it can be seen that controller 26 receives inputs from distance sensors 42, power source 24, and user inputs 36 (including reversing switch 34, button 38, actuator 50, and the subsequently described user interface controls). Controller 26 also receives inputs from a variety of other internal and external sensors, which are represented as a group in FIG. 7 with reference numeral 125. These sensors may include sensors to detect the speed of rotation of the chuck, the relative rotational position of the chuck with respect to the body of the tool, the position of the trigger along its possible range of positions, the torque exerted on the work element, the life of the battery, the amount of energy drawn from the battery and the rate at which such energy is being drawn, and the axial pressure being applied to the work element, among others. It should be understood that none of these sensors are essential to all embodiments of the invention, and that a particular embodiment may include none, some, or all of these sensors. Other conventional sensors used in electrically powered hand tools, such as temperature sensors to prevent overheating, may be included as well.

Controller 26 controls the operation of the tool. This includes regulating the supply of power to motor 20, responding to signals from user inputs and sensors, and controlling the display on user interface 40. Controller 26 regulates the amount of power delivered to motor 20 responsive to the inputs from the sensors and user inputs, thereby controlling the torque and rotation of the work element. Controller 26 typically includes a microprocessor or microcontroller with associated memory for data and instructions to control the operation of the motor and user interface. Preferably, this memory includes at least a non-volatile component so that stored values are not lost when the tool's power source (i.e. battery or connection to an electrical outlet) is disconnected. Furthermore, the memory and programming stored therein preferably may be selectively upgraded from a remote source, such as any of the computing devices described herein. One advantage of providing an upgradeable programming for the controller is that new functions can be added as they are developed without requiring replacement of the entire device. To this end, it is preferable, although certainly not essential, that the user interface display be of the bit-mapped type, rather than icon based so that greater freedom is provided in changing the appearance of the display with updated programming.

Although a microcontroller is preferred because of the flexibility provided thereby, it should be understood that the various features and functions described herein could also be implemented with a controller utilizing analog circuitry.

The controller monitors signals from the various user inputs and sensors to control the operation of the tool. As will be understood by those of skill in the art, the controller will typically control the speed and torque of the motor by regulating power to the motor using one or more MOSFET transistors or TRIAC devices. Either type of device can be operated with logic level signals, such as output from a microcontroller and MOSFETs are capable of rapidly switching the high currents sometimes utilized in battery powered tools.

With most variable speed tools, the controller regulates power to the motor by sending short pulses of full power to the motor. The pulses typically have a frequency between several hundred and tens of thousands of hertz. By varying the duty cycle of the pulses, i.e. the ratio of the on to off time, the controller can control how much power is delivered to the motor. By monitoring the rotation of the motor or chuck, the controller can send more power if the chuck slows below the desired speed or reduce the power if the chuck is rotating to fast. Thus, in modern variable speed tools, battery-powered or corded, the trigger is normally used to select a desired speed, and the controller makes whatever power adjustments are necessary to achieve that speed within the range of available power and limited by feedback rates. In general, for purposes of the embodiments of the present invention which utilize speed or torque control, any known speed control system which can regulate motor speed and/or torque can be used. See, for example, U.S. Pat. Nos. 4,307,325, 4,317,176, 4,412,158, 4,503,370, 5,563,482, 5,754,019, and 5,798,584, which are incorporated herein by reference, for disclosures of speed and torque controls for use in power tools.

Little additional circuit complexity is required for control of a poly-phase motor beyond that required for variable speed control of DC or AC motors. In particular, as is well understood in the art of poly-phase motors and controllers, by sequentially pulsing power to the windings, the armature can be made to rotate. The armature can rely on induced magnetic fields or can utilize a permanent magnet. Just as with DC motor control, the torque of the motor at a given speed can be regulated by regulating the duty cycle of the pulses to the windings. Similarly, changing the sequential rate at which the windings are energized can control the speed of rotation. One example of a suitable poly-phase motor for use in certain embodiments of the present invention is sold by Model Electronics Corp. of Seattle, Wash. as the MEC Turbo 10/20 Brushless motor. See also U.S. Pat. No. 5,619,085, which is incorporated herein by reference, for additional details and background on the design and control of small poly-phase motors.

As mentioned above, poly-phase motors offer certain advantages in some applications. For instance, because poly-phase motors do not include brushes, it is quite simple to seal the electrical components of such motors against shorting by water. In fact, such motors can operate normally with the armature completely submerged as long as all of the electrical wiring is insulated to prevent water from reaching the conductors. Furthermore, because the rotational direction can be reversed by changing the sequence in which the windings are energized, there is no need for a mechanical switch to reverse the motor, as is used in most battery-powered drills. Typical DC reversing switches used in battery operated drills are double-pole double-throw devices. These switches have twelve contacts and are therefore relatively complex and expensive. They are also subject to failure in any one of the contacts. With a poly-phase motor, only a single contact momentary switch is needed to signal the controller to reverse the motor. This solid-state reversing capability of a poly-phase motor is also useful in the hereinafter described tap and chuck lock modes, for instance, where it is desirable to reverse the motor without direct input from the user. Also, this makes sealing the electronics against water much simpler.

The armature of a poly-phase motor does not require any direct electrical connection to the remainder of the motor. In fact, the armature may simply consist of permanent magnets. Even if an armature with induction windings is used, it is a simple matter to dip the armature in an insulating varnish or other coating to prevent shorting by water. The fixed winding on the housing of the motor are likewise isolated by coating with an insulating material. Such dipping can be completed after assembly so that any wire joints are similarly insulated. The absence of brushes also makes a poly-phase motor preferable in potentially explosive environments because of the elimination of sparking that occurs at such brushes. Thus, drill 90 shown in FIG. 4 and equipped with a poly-phase motor and relatively simple shielding of electrical components can readily be operated in a wet environment or even underwater.

Another embodiment of a tool constructed according to the present invention is shown in FIG. 8 and indicated generally at 130. Tool 130 differs from tools 10 and 90 in that it has a much smaller housing 132 that is sized to be held in a user's palm. As shown, housing 132 has a generally cylindrical or disk-like configuration, with a front portion 134, a rear portion 136, and an edge region 138 extending between the perimeters of the front and rear portions. As shown, edge region 138 includes a contact surface, which preferably is adapted to provide for secure gripping by a user. For example, the surface may be formed of a tactile, non-slick surface so that the user may easily grasp the tool and maintain the user's grip while the tool is operated and subjected to torque. As such, it may also be referred to as a user-grippable surface.

As shown, tool 130 also includes a plurality of ergonomic protrusions 142 that define wells, or recesses, 144 into which the user's fingers may be seated to provide a firmer grip and increased resistance to inadvertent rotation. As shown in FIG. 8, protrusions 142 radiate outward from edge region 138 to define finger recesses 144. However, it is within the scope of the invention that the recesses may extend inwardly from edge region 138. Other configurations for housing 132 may be used, including cylindrical and other geometrically and ergonomically shaped housings.

Also shown in FIG. 8 are a power supply 24 (in this case a power cord 146 with a plug 148), the previously described distance sensors 42, and a portion of the tool's work element 22, including a keyless chuck 150. Instead of power cord 146, tool 130 may also be powered by a battery, which may be directly coupled to the housing of tool 130. To reduce the size and weight of tool 130 that must be supported by the user in one hand, the battery may be electronically coupled to the tool by a power cord, such as described previously. For example, in place of plug 148, cord 146 may include a receptacle adapted to receive the terminal portion of a battery.

Tool 130 further includes an actuator (which in this embodiment is a push button 152), a reversing switch 153, and a manual chuck hold 154. Tool 130 optionally may include an input port 156 for the embodiment of the user interface shown in FIG. 6. Alternatively, the tool 130 may not include the user interface, may include the user interface mounted on housing 130, such as on rear portion 136, or may include a user interface that communicates with the controller via wireless communication, as also shown and described with respect to FIG. 6.

Figure 9:
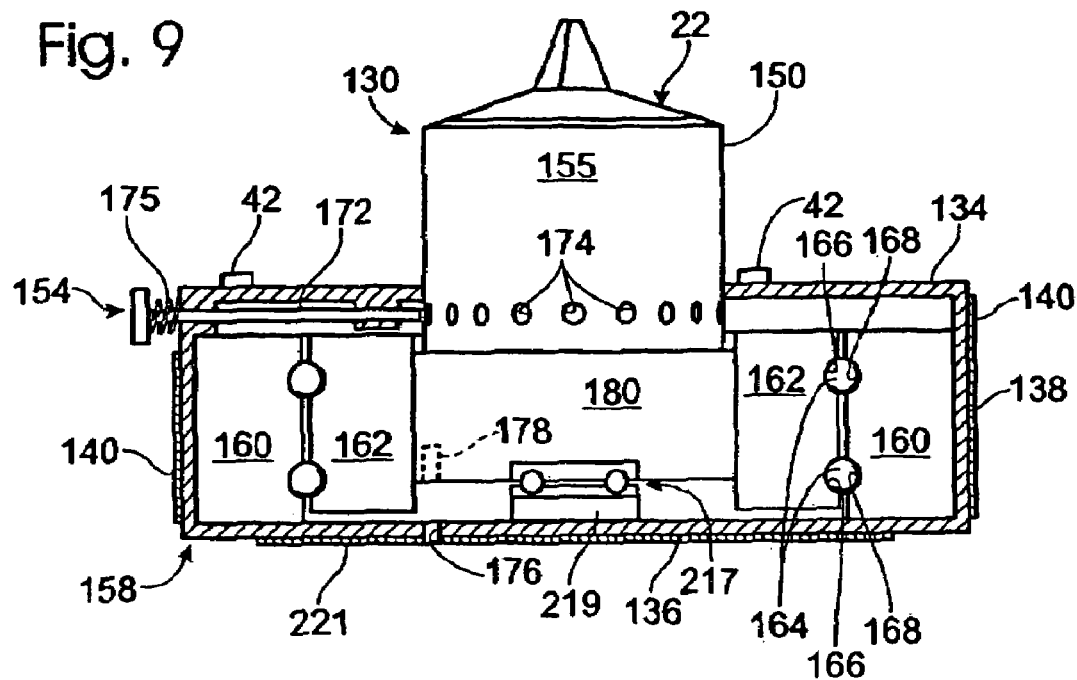
FIG. 9 is a cross-sectional view of the tool of FIG. 8.

In FIG. 9, one possible internal construction for drill 130 is shown. Besides the previously described housing 132, work element 22 and power source 24, drill 130 includes a motor 158. Motor 158 includes field windings 160 and an armature 162. For purposes of simplifying the drawings, wiring and other conventional sensors are not shown in FIGS. 8 and 9. It should be understood that conventional wiring and internal sensors and controls are also contained within shell 132, as is known in the art. The same applies to the previously described embodiments according to the present invention.

In the embodiment illustrated in FIG. 9, the armature surrounds the chuck, and they are joined to rotate as a unit. Bearings 164 roll in races 166 and 168 formed on opposed faces of the armature and field windings. Similar to the previously described embodiments, the armature and windings can be of the DC, AC/DC or poly-phase type. Although it is not essential that the winding and/or armature surround the chuck, the greater diameter of the windings and armature increases the available torque relative to a smaller diameter motor. Preferably, motor 158 is a brushless motor that does not require external venting, and the electrical components are sealed against entry of water to permit operation of the tool in wet environments.

Chuck hold 154 allows the user to hold a shell 155 of the chuck stationary while operating the motor to tighten or loosen the chuck on a bit (not shown). By pressing the chuck hold, a rod 172 is pushed into one of multiple lock holes 174 formed in the shell of the chuck. Once the chuck is sufficiently loosened or tightened, such as to respectively allow insertion or removal of a bit, the chuck hold is released and rod 172 is withdrawn from the lock hole within which it was inserted. As shown in FIG. 9, a spring 175 is biased to automatically withdraw rod 172 from the lock holes when a user stops pressing on chuck hold 154.

An auxiliary armature access hole 176 is provided to allow manual locking and unlocking of the chuck via an access hole on rear portion 136. In particular, by inserting a nail or similar member in the access hole, the base 180 of the chuck can be prevented from rotating and the user can turn the shell of the chuck manually. Alternatively, a push button mechanism with a pin or rod, such as that shown with respect to chuck hold 154, may be used in place of the access hole and inserted member. In either embodiment, depressing the button or inserting a nail or other member into hole 176 causes the pin or inserted member to engage a receptacle 178 formed in the base 180 of chuck 150.

Figure 10:
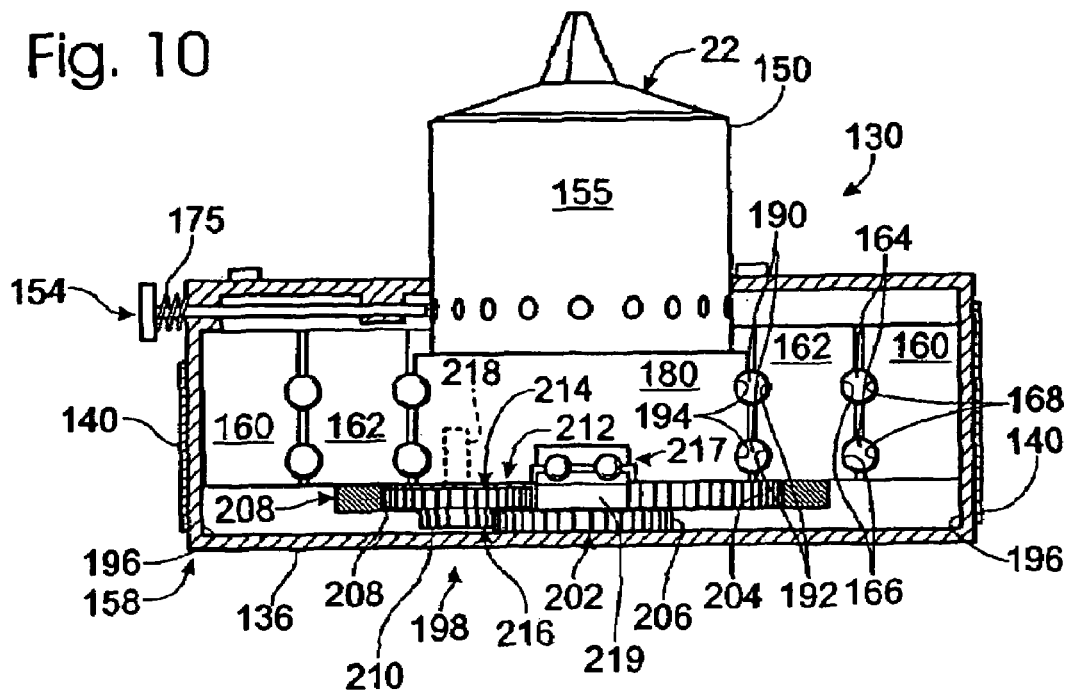
FIG. 10 is a cross-sectional view of another embodiment of the internal construction of the tool of FIG. 8.

Another illustrative example of a suitable internal construction of tool 130 is shown in FIG. 10. In FIG. 10, tool 130 not only includes bearings 164 which roll in races 166 and 168 formed on opposed faces of armature 162 and field windings 160, but also includes bearings 190 which roll in races 192 and 194 formed in opposed faces of armature 162 and base 180. In this configuration, field windings 160, armature 162 and base 180 of chuck 150 all are rotatable relative to each other. Field windings 160 are fixed relative to housing 132, such as being secured to the inner edge 196 of the housing (as shown in FIG. 10) or otherwise mounted within the housing.

In FIG. 10, tool 130 includes a gear system, which is generally indicated at 198 and which is adapted to reduce the speed at which the chuck rotates relative to the speed of rotation of the armature. Gear system 198 includes a ring gear 200 that is mounted on the armature 162 and extends beneath chuck 150. Although armature 162 may include gaps between adjacent segments, ring gear 200 forms a complete circle within the housing. Gear system 198 further includes a fixed gear 202 that is non-rotatably mounted on the lower surface of the housing. As shown, fixed gear 202 is in the form of a sun gear, however, it may also be a ring gear or other suitable structure.

Ring gear 200 and fixed gear 202 respectively include teeth 204 and 206 that are engaged by corresponding teeth 208 and 210 on at least one planetary gear 212. Although only one planetary gear 212 is shown in the sectional view of FIG. 10, it should be understood that it is preferable that at least two or three equally spaced-apart gears are used to minimize the asymmetric torque created by the rotation of the gears about fixed gear 202. Each planetary gear 212 includes a drive gear 214 and a pinion gear 216. Each planetary gear is rotatably supported on an axis 218 secured to the chuck.

As armature 162 rotates, ring gear 200 drives the rotation of the planetary gears. The planetary gears are then driven to orbit the fixed gear by spin imparted from the ring gear. Because the planetary gears are mounted to the chuck, the chuck rotates with the orbit of the planetary gears. This configuration provides a substantial reduction in the rotation speed of the chuck and corresponding increase in torque. The speed can be controlled by selecting the size of the drive, pinion and sun gears, relative to each other and the ring gear. It will of course be understood that many other gear arrangements could also produce suitable speed reduction, and that the configuration shown in FIG. 10 is shown to illustrate one suitable embodiment.

Located between the back of the chuck and the front of the sun gear in FIG. 10 are a thrust bearing 217 and a force transducer 219. Similarly, in FIG. 9, thrust bearing 217 and force transducer 219 are shown extending between the base of the chuck and the lower surface of housing 132. Thrust bearing 217 bears the axial load created during operation of the tool, and force transducer 219 is used to monitor the amount of force or pressure being applied to the tool. As previously described in the context of a trigger, any of numerous different types of force-sensing devices may be used for transducer 219. The output of the transducer is fed to the controller to be used in regulating torque in some modes, as is described below. Alternatively, the force sensing transducer could be applied as a layer to the back of the housing as shown in FIG. 9 to directly sense the pressure applied to the drill. Of course, similar force transducers could be utilized in connection with the other embodiments described with modifications appropriate to the particular application, to enable the below-described push mode functionality.

Figure 11:
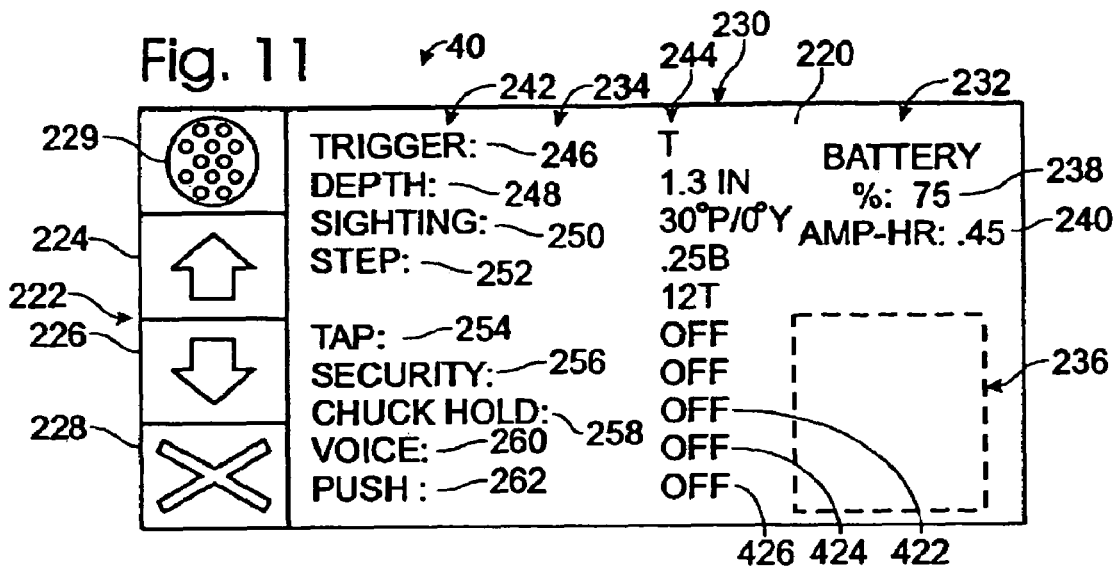
FIG. 11 is an enlarged detail of the user interface of FIGS. 1 and 4–5 in which a default screen is displayed.

In FIG. 11, user interface 40 is shown in more detail. Interface 40 includes a display 220 and a plurality of user input controls, which are generally indicated at 222. As shown, the controls include a plurality of push buttons 224, 226 and 228, as well as a microphone/speaker 229. Buttons 224–228 enable a user to toggle between the screens and modes displayable on display 220, and to select and input values for any of the available options, as discussed in more detail subsequently. In the embodiment shown, buttons 224–228 respectively include up arrow, down arrow and enter buttons, however, it is within the scope of the invention that other configurations and numbers of buttons may be used. Similarly, other forms of user input controls may be used, such as slides, track balls, switches, and pointing devices. Of course, although the described user interface is relatively large and complex, it is also possible to provide a much smaller user interface which less information displayed at a time.

Trigger 50 may also be used to provide user inputs, as can chuck 150. Both trigger 50 and chuck 150 can be provided with associated internal sensors to determine the relative position of the trigger and chuck. The signals from these sensors may also be used to selectively scroll through a range of possible values or to establish selected readings. An advantage of chuck 150 as a user-input device is that it is rotatable both clockwise and counterclockwise without having a limited range of positions like the trigger which only travels in a range between defined end points. The user-input controls may also include an on/off button that selectively disables display 220 and/or buttons 224–228.

FIG. 11 illustrates a default, or home, screen 230 of display 220. This is the screen that is most often displayed to a user, and to which the controller defaults after user inputs are completed on any of the subsequently described screens. As shown, screen 230 includes a battery region 232, a settings region 234 and a feedback region 236.

Battery region 232 provides a user with information about the status of battery 54. As shown, region 232 displays at 238 the percentage of theoretical battery life remaining, and at 240 the energy (typically measured in amp-hours) output by the battery since installed. Either of these readings may be displayed independent of the other, and other textual or symbolic representations may be used. For example, the icon of a battery with incremental bar-graph-like readings may be used to represent the theoretical amount of battery life remaining, and a number may be understood to represent the amount of work performed.

This feature is useful to allow a user to monitor the status of the battery during use. In particular, a user would want to check the remaining battery capacity before starting a project that may require more battery reserve than currently available. This is especially true if the task is carried out on a ladder or other location where changing the battery might prove difficult. By comparing the battery output actually used with the theoretical or historical capacity of the particular battery pack, a user is able to determine whether a particular battery pack is performing up to expectations. The battery output is monitored, for example, by sensing the current from the battery via a current sensor (not shown). The integral of that signal over time corresponds to the total current output of the pack, while the instantaneous signal can also be displayed to indicate the real-time load on the battery.

Settings region 234 displays information to the user about the current setup of programmed and user-selected modes for the tool. As shown in FIG. 11, region 234 includes at least one mode 242 and its (their) corresponding value(s) 244. For example, as shown in FIG. 11, nine operational modes are shown, each of which has at least one value. The nine illustrated modes are trigger 246, distance 248, sighting 250, step 252, tap 254, security 256, chuck hold 258, voice 260 and push 262, each of which has at least one corresponding value and may trigger the display of one or more additional screens, as described in more detail subsequently. It should be understood that icons may be used in place of or in conjunction with the textual names for the modes.

Values 244 are stored in the memory of controller 26. Responsive to the user-selected and/or predetermined values, controller regulates and adjusts the interaction of actuator 50, power source 24, motor 20, work unit 22, as well as the sensors and user-inputs. For example, by pressing enter button 228, the first displayed mode, namely, trigger mode 246 is highlighted or otherwise indicated to be the temporarily selected mode. By pressing the enter button again, trigger mode is selected, thereby either enabling the user to directly adjust the corresponding value, or replacing default screen 230 with one or more additional screens through which the selected mode is configured and user-inputs are inputted.

Alternatively, instead of pressing the enter button again to select the currently highlighted mode, arrow buttons 224 and 226 may be used to scroll through the available modes. When the desired mode is temporarily selected, enter button 228 can then be pressed to adjust the configuration of that mode. In addition to, or in place of, the use of the arrow and enter buttons to select modes, trigger 50, chuck 28 and user-input button 38 may be used. For example, the rotation of the chuck may be used to scroll between available modes or settings, while the trigger is used to select an indicated mode or setting. In this configuration, a user-input button, such as button 38 or enter button 226 typically is initially pressed to indicate to the controller that the chuck and trigger are temporarily to be used to configure the user interface instead of being used to operate the tool.

Figure 12:
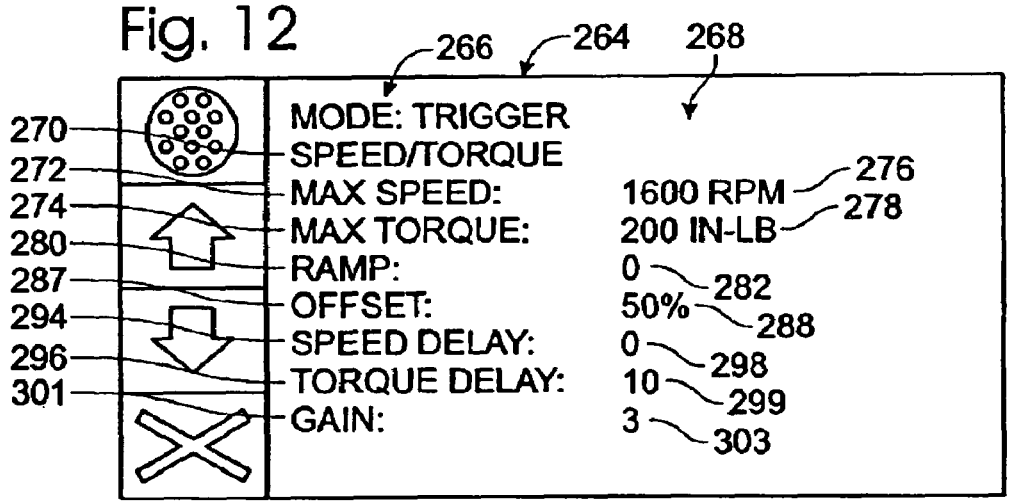
FIG. 12 is the user interface of FIG. 11 showing a trigger screen.

Turning to the details of trigger mode 246, it enables a user to selectively use trigger 50 to control the speed of rotation of the chuck, or alternatively to control the torque exerted by the chuck. When trigger mode 246 is selected, default screen 230 is replaced with trigger screen 264, which contains its own sequence of settings 266 and corresponding values 268. As shown in FIG. 12, trigger screen 264 includes multiple settings, including a setting 270 in which the user toggles between the trigger controlling the torque or the speed of the work element. As a reminder to the user when user interface 40 returns to its default screen 230, the selected value for setting 270 is also shown on default screen 230 as either a "T" (trigger) or a "S" (speed).

When the speed of rotation option is selected, the tool functions much like a conventional drill, in that actuation of trigger 50 controls the speed of rotation of the work element. Therefore, when the trigger is not actuated, the work element is in its resting, non-rotating position. As the trigger is actuated, work element 22 begins to spin, and the rate of rotation of the work element continues to increase to a maximum speed of rotation when the trigger is fully actuated.

On the other hand, when the torque option is selected, actuation of trigger 50 controls the torque exerted by the work element. Because this option enables the user to positively control the force exerted, it reduces the likelihood of stripping a screw or driving a screw through a work piece because too much force is inadvertently applied. Instead, the user can select and apply only the required amount of force, or torque. An example of when this torque control is desirable is when the tool is used to drill or screw into a series of work pieces of varying or undetermined density. Where one amount of torque may be preferred for a particular density of work piece, another torque may be preferred as that density changes.

As trigger 50 is actuated from its resting position, the applied torque at the chuck is increased from zero. Once the applied torque exceeds the force necessary to start chuck 28 rotating, such as to turn a screw, the chuck begins to rotate up to a defined maximum speed. Regardless of the speed of rotation, however, the applied torque remains controlled by trigger 50. Therefore, once chuck 50 is rotating, further actuating the trigger will increase the available applied torque without directly increasing the speed of rotation. The speed of rotation will be established at a defined maximum value. Sometimes, this maximum speed will not be obtained because insufficient torque is being applied. Therefore, as the applied torque is increased, the speed may be increased indirectly because the maximum value is now completely, or more closely, attained.

Rather than abruptly increasing to the maximum speed as soon as the applied torque exceeds the torque required to start the chuck rotating, a gradual feedback is preferably incorporated. Therefore, if the applied torque exceeds the required torque only slightly, the speed at which the chuck rotates will remain relatively low. As the trigger is further depressed and the spread between the applied torque and the required torque increases, so will the speed. This feedback gain prevents abrupt speed changes and allows the user to control the speed even in torque mode. A value 303 of a gain coefficient 301 between the torque differential and the speed can be selectively adjusted by the user to provide a desired response.

From trigger mode 246, the user also may selectively control the maximum speed of rotation and the maximum applied torque. As shown in FIG. 12, these options are controlled via settings 272 and 274. Both respectively give a user control over options that previously could at best only be chosen from a few discrete, pre-established values. For example, in FIG. 12, speed setting 272 has a corresponding value 276 of 1600 rpm. Value 276 may be inputted via any of the previously described user inputs. For example, the user's selected maximum speed of rotation for a particular project may be inputted by scrolling through a menu of available speeds with push buttons or rotation of the chuck, or by inputting a selected value digit by digit. Instead of the relatively high speed shown in FIG. 12, it should be understood that a relatively low maximum speed may be entered as well. A low maximum speed enables the user to have much more control over the relative speed of the work element within this now narrower range of speeds, relative to the same range of positions of the trigger.

In FIG. 12, it may also be seen that maximum torque setting 274 has its own corresponding value 278, through which the user selectively controls the maximum torque applied to the work element. It should be understood that settings 272 and 274 have the synergistic effect of enabling the user to have full control over both the maximum applied torque and the maximum speed at which the chuck will rotate, with either of these settings being selectively controlled during operation via trigger 50 responsive to setting 270. The settings essentially enable the user to optimize the tool on a case-by-case basis to selectively utilize a discrete, user-selected subset of the maximum ranges of speed and/or torque available.

Besides selectively controlling the maximum speed of rotation and maximum applied torque, trigger mode 246 also enables the user to select the profile through which the speed or torque (depending on the selected configuration of setting 270) is ramped up and down responsive to the relative position of the trigger. The profile is selected via setting 280 and includes a corresponding user-selected value 282. Value 282 may be selected between a range of values centered about a standard, or linear relationship between the resting and fully actuated trigger positions with respect to a speed of zero and the maximum speed, such as entered at value 276. In FIG. 12, this standard, or default, setting is indicated with a zero at value 282. If the user desires a more rapid ramp, then values greater than zero may be entered, and if the user desires a slowed ramp, then values less than zero may be entered. Any suitable range of possible values may be used, however, a range of between −10 and 10, and even between −5 and 5 should be sufficient to provide suitable range of profiles.

Figure 13:
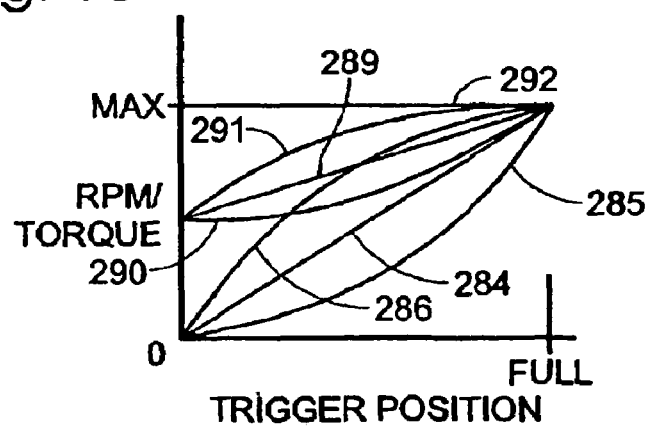
FIG. 13 is a graph illustrating examples of possible ramp profiles.

In FIG. 13, several profiles are depicted as an illustrative example of possible profiles. In FIG. 13, the X-axis corresponds to the relative position of the trigger between a resting position and its fully actuated position. The Y-axis corresponds to the speed or torque, between a zero value and the maximum value, which may be either predetermined or user-selected at values 276 and 278. At 284, a linear profile is shown and corresponds to the zero value shown in FIG. 12. Also shown are a generally exponential curve 285 and a generally inversely proportional curve 286, which respectively correspond to values below and above zero.

Referring back to FIG. 12, it can be seen that trigger screen 264 further includes an offset setting 287, with a corresponding value 288. The offset is measured as a percentage of the maximum speed or torque value, and corresponds to the immediate step, or jump, to which the speed or torque is increased upon any displacement of the trigger from its resting position. For example, in FIG. 12, offset value 288 is 50, which corresponds to fifty-percent of the maximum speed or torque, whichever is selected at setting 270. Therefore, if torque is selected, then the offset value would correspond to 100 in-lbs, and if speed is selected, then the offset value would correspond to 800 rpm.

Returning to FIG. 13, examples of ramp profiles 284–286 adjusted for the inputted offset value 288 are shown and respectively indicated at 289–291. It can be seen that regardless of the offset, the curves all still terminate at the same maximum value. It should be understood that profiles 284–286 correspond to an offset value of zero, while an offset value of 100 corresponds to profile 292, which means that the tool will operate at a constant speed or apply a constant torque anytime the trigger is not in its resting position. This constant value corresponds to the inputted or predetermined maximum value.

By selecting a particular ramp profile, the user now can select the rate at which the rotation or applied torque increases or decreases in response to the position of trigger 50. Sometimes, however, external forces will affect the speed of rotation of the work piece or the applied torque. For example, when a conventional drill is driving a screw, the bit may be inadvertently withdrawn from the head of the screw, or the bit may "cam out" of the groove or grooves in the head of the screw. When this occurs, the load on the bit is significantly decreased and the drill will immediately speed up to the maximum speed allowed by the current trigger position. This typically causes the bit to strip the head of the screw, and may also result in damage to the bit. Similarly, when driving a screw or drilling a hole, the bit sometimes binds and is prevented from being rotated further. When this occurs, a conventional drill will automatically apply the maximum possible torque. Because the screw or bit typically remains pinned, the applied torque instead causes the body and handle of the drill to be quickly rotated with respect to the bit. Unless the user releases the trigger quickly enough or is strong enough to exert a sufficient counter torque, the user's wrist may become injured by being impelled into an adjacent object or sprained from the sudden, unexpected rotational movement. This sudden rotation and impact also may damage the tool.

To prevent, or at least reduce the likelihood of these problems caused by automatic, near instantaneous increases in speed or torque responsive to external, unintentional forces, the tool includes speed and torque rate delay settings 294 and 296. These settings, with their corresponding values 298 and 299, shown in FIG. 12, enable a user to select the rate at which the speed and/or torque adjusts responsive to external forces (or the removal thereof). Typically, values 298 and 299 are selected from a range of possible values, such as low, medium and high values, or a range of numerical values corresponding to a relative range of delays. For example, values 298 and 299 are respectively shown as zero and ten, which correspond to the end points on a range of zero to ten. A value of zero corresponds to no delay, and therefore the tool will operate like the conventional drills discussed above. On the other hand, a value of ten corresponds to a relatively large delay, such as a ten percent change per second. Other ranges and percentages may be used, and the above are merely presented as illustrative examples.

From default, or home, screen 230, the user may also select distance mode 248. Distance mode 248 makes use of distance sensors 42, each of which is adapted to measure the distance from the sensor to a work piece. Any suitable distance measuring structure in which a signal is emitted to measure the distance between the emitting unit and an object may be used. For example, sensor 42 may emit and detect an infrared or other suitable light signal, an ultrasonic signal, or any other suitable form of distance-measuring signal. In FIG. 1, four sensors are shown (one on the far side of the tool) to measure the distance from above, below, and both sides of chuck 28 to work piece 300. In FIG. 8, three such sensors are shown. It should be understood that the number and placement of the sensors may vary, although typically between one and four sensors will be sufficient.

Figure 14:
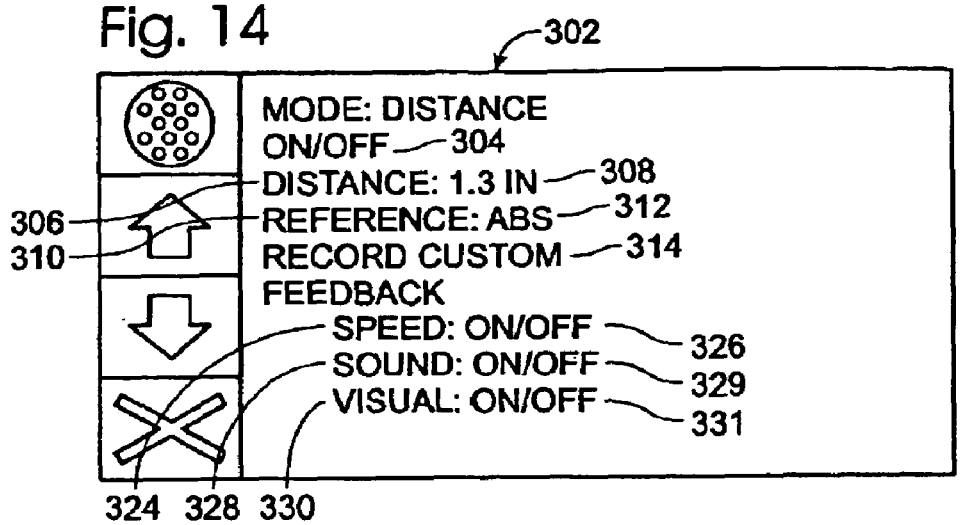
FIG. 14 is the user interface of FIG. 11 showing a distance screen.

Distance mode 248 enables a user to utilize distance sensors 42 to actively or passively control the distance to which a bit or screw is inserted into a surface. When distance mode 248 is selected, the default screen is replaced with a distance screen 302, which is shown in FIG. 14. As shown, distance screen 302 includes a setting 304 for selectively enabling or disabling the distance mode, as well as a distance setting 306 with a corresponding user-selected value 308. After selecting the distance mode, the user selectively inputs the desired distance at value 308. This distance is measured relative to a determined reference position on the tool. For example, the distance may be measured from the tip of the chuck, from a portion of the distance sensors, etc. Virtually any reference position may be used, so long as the reference position is known to the user. In FIG. 14, a distance value 308 of 1.3 inches is shown. This distance is also shown on default screen 130 so that the user can recall the selected distance value without having to return to the distance screen.

Distance screen 302 includes a reference setting 310, which as shown has a value 312 of "abs" (or absolute). When the relative reference value is selected, controller 26 measures the selected distance relative to the determined reference on the tool, such as the tip of the chuck. For instance, if the distance is 1.3 inches, the controller will consider the current operation completed when the measured position of the workpiece is 1.3 inches beyond the tip of the chuck. By way of example, if the user is needs to drive numerous screws with possibly different lengths flush to the surface of a work piece, the user can select an absolute distance that is even with the tip of the bit being used to drive the screws. Thus, no matter where the drill starts, it will not consider the operation completed until the bit, and therefore the screw, is flush with the surface of the workpiece. This features is particularly useful for installing screws in drywall where it is desirable to have screws flush with the surface of the workpiece, but very easy to accidentally over drive the screws.

In a second, relative or "rel" setting, the controller measures the distance at the when the operation begins, i.e., when the trigger is first pulled, and considered the operation completed when the measured distance is 1.3 inches closer to the workpiece. In this mode, it is possible to drill a hole of a predetermined depth by placing the drill bit against the workpiece and starting to drill. When the drill is 1.3 inches closer to the workpiece, i.e., a 1.3 inch deep holes has been bored, the controller will consider the operation complete.

As another alternative, the user may record a custom distance, thereby freeing the user from having to measure the desired distance manually. This option is particularly, useful when the user must repeatedly drive equally sized screws into a work piece. Because the length of the screws does not vary, the user only needs to initially measure the desired distance and then use this measurement for each subsequent screw.

Upon selection of distance mode 248 and further selection of record custom setting 314, controller 26 will prompt the user to place the tool in the desired position, and then to activate one of the user input buttons to cause sensors 42 to measure current distance. In absolute mode, this distance is stored in the memory of the controller as the desired distance. In relative mode, the controller prompts the user to place the tool in a second position where a second distance is measured. The difference between these positions is then used as the desired distance.

When the desired distance has been reached, the controller automatically stops the operation of the tool, or otherwise signals the user, to prevent the desired distance from being exceeded. As an additional option, the motor also may be gradually slowed as the desired distance is approached to reduce the chance of overshooting. This may be accomplished by any suitable method, such as by shutting off power to the motor, or by electronically braking the work element, or by applying a reverse torque to stop the motor more quickly. This feedback mechanism is referred to in FIG. 14 as speed feedback mechanism 324 and includes a corresponding on/off value 326. As an additional option, the motor also may be gradually slowed as the desired distance is approached to reduce the chance of overshooting. Other forms of feedback mechanisms to the user may be used, either alone or in conjunction with each other and/or speed mechanism 324. For example, sound and visual feedback mechanisms 328 and 330, with respective on/off values 329 and 331, are also shown in FIG. 14 and discussed in more detail below. Automatically stopping the rotation of the work element may be preferred to many users because it prevents the desired distance from inadvertently being exceeded, such as if a user does not react to the feedback mechanism fast enough, or if the user does not detect the feedback mechanism.

Preferably, there are sufficient sensors oriented around the work element to enable the controller to not only measure the distance to work piece 300, but also to determine the relative angular orientation of the tool with respect to the work piece. In fact, sighting mode 250 makes use of such a feedback mechanism. Having multiple distance sensors oriented in known relative distances to work element 22 and to each other, the controller can calculate the relative angular orientation of the tool with respect to the work piece. For example, in FIG. 4, long axis 116 of the body of the tool extends at a pitch angle to a normal axis of work piece 300. In such a configuration, the sensors on the sides of the body will measure the same distance to the work piece, thereby indicating no yaw, however, the upper sensor will measure a greater distance than the lower sensor, indicating a pitch inclination.

Using the relative spacing and orientation of the sensors with respect to each other, the controller can calculate, responsive to feedback from the sensors, that tool 10 is inclined at a pitch of, for example, 300 and a yaw of 0° relative to the plane of work piece 300. This feature is useful when a user wants to drill a hole or drive a screw at a particular angle into the work piece. The angular orientation described above is shown in FIG. 4, in which the above-described pitch angle is generally indicated at 332. However, virtually any desired angle may be selected, including both pitch and yaw inclines.

Another useful angle is shown in FIG. 1, in which the drill is oriented completely normal to the work piece. This normal orientation would typically be most often used with the sighting mode because it enables the user to drill holes or drive screws at right angles to the work piece. With prior art drivers, screws are often driven in at a substantial angle off normal. In this event, the user must either leave a portion of the head of the screw exposed and extending at an angle or countersink the screw into the work piece a sufficient distance that no portion of the head of the screw extends beyond the plane of the work piece. Unfortunately, with some work pieces, such as drywall, neither option is acceptable, with the first leaving an uneven surface, and the second resulting in the outer surface of the work piece being punctured, thereby reducing the retaining force of the screw.

Because sensors 42 and controller 26 determine the relative position of the tool with respect to the work piece, this determination is made independent of the relative orientation of the work piece to the ground or any other surface. Therefore, this feature may be effectively used even when the tool and/or work piece extend at an angle to the surface upon which the user is standing or to a true horizontal and vertical position.

Figure 15:
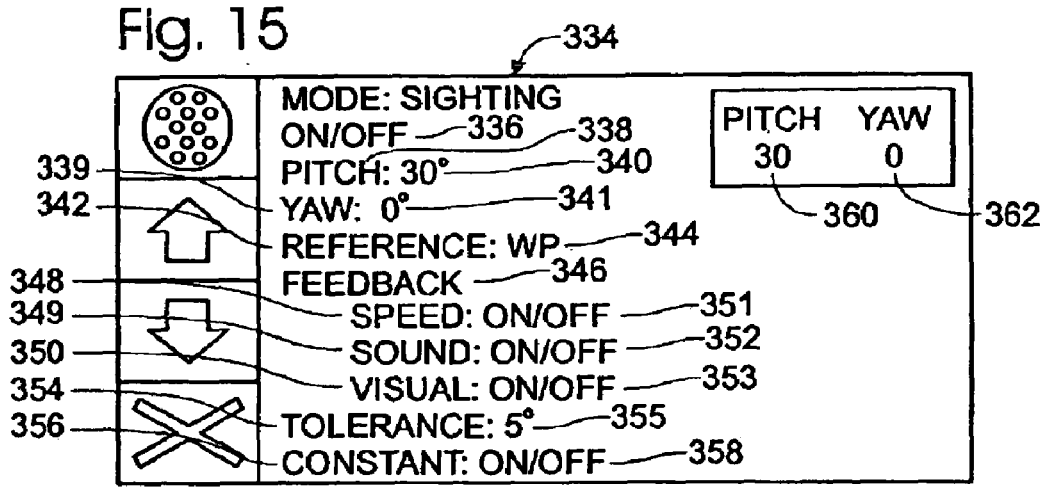
FIG. 15 is the user interface of FIG. 11 showing a sighting screen.

When sighting mode 250 is selected, default screen 230 is replaced with sighting screen 334, which is shown in FIG. 15. As shown, sighting screen 334 includes an on/offsetting 336, as well as pitch and yaw angle settings 338 and 339. Angle settings 338 and 339 enable the user to input the desired pitch and yaw values 340 and 341. For example, this may be accomplished by scrolling through a sequence of displayed values, preferably utilizing the chuck for ease of input, or by inputting the desired value, relative to a reference setting 342 determined by reference frame value 344. Reference setting 342 determines the relative position (pitch and yaw) from which angle value 340 is measured. Two illustrative reference values are "work piece" and "absolute." When the reference value is "work piece" (abbreviated "WP" in FIG. 15), the pitch and yaw of the long axis of the tool are measured relative to a normal axis of the workpiece. This configuration is useful when the user wishes to use a selected orientation relative to the plane of the work piece, regardless of the particular angular orientation of the work piece relative to the ground, true vertical and horizontal positions, etc.

When the reference value is "absolute" (abs), the pitch of the axis of the work piece is measured relative to a true horizontal, while the yaw is still measured relative to the work piece. The absolute pitch is determined by reference to a digital level such as is well known in the art, incorporated as one of the sensors used by the controller. As a side benefit of providing a digital level sensor, it is possible to utilize the drill as a level. The current pitch inclination angle can be reported on the sighting mode screen or the default screen. By setting any surface of the drill that is parallel to the long axis of the drill, such as the bottom of the battery or the top of the drill, on a work piece, the angle of the work piece will be reported.

Besides inputting the user's desired angle values and reference position, sighting screen 334 enables the user to also select the type or types of feedback mechanism 346 to be used. Feedback mechanisms 346 indicate to the user when the tool is at the selected angle value, and may also provide signals to the user to properly orient the tool when it is not oriented at the selected angle value. Three illustrative feedback mechanisms 346 are shown in FIG. 15, and it should be understood that one or more may be used together, and that there may be other suitable mechanisms as well. As shown, these mechanisms include speed 348, sound 349 and visual 350, each with a corresponding on/offsetting 351, 352 and 353.

Speed feedback mechanism 348 can take two forms, as with the above described distance mode. First it can prevent the tool from operating until the tool is oriented in the desired angular position. Once this orientation is achieved, the controller, responsive to signals from the distance sensors, enables operation of the tool. Alternatively, the speed feedback mechanism may slow the drill proportionally to how far off of the desired angle the drill is oriented. Sound feedback mechanism 349 presents an audible signal to the user when the tool is in the selected angular orientation. In a variation of this mechanism, the sound feedback mechanism may emit via microphone/speaker 229 a series of beeps or other noises to the user that guide the user in the positioning of the tool. For example, the beeps may become louder, more frequent, and/or change in pitch the closer the tool is to the desired angular orientation, similar to the speed change described. Visual feedback mechanism 350 presents a visual signal on display 220. For example, in FIG. 11 feedback region 236 is shown. This signal may be as simple as a light or other symbol being displayed on the display when the tool is in the desired angular orientation. In a variation of the visual feedback mechanism, arrows or other visual direction-guiding signals are presented to guide the user to the desired angular orientation of the tool. The feedback region 236 may vary in its size, and it may be displayed on a screen other than default screen 230.

Because it is not always be necessary to maintain the exact angular value desired, sighting screen 334 also includes a tolerance setting 354 with a corresponding tolerance value 355. Using the tolerance, the user can select the degree of tolerance, or range of error, within which the desired angular value may be achieved. For example, as shown in FIG. 15, a tolerance value of 5 degrees is shown. Preferably, the feedback mechanisms (speed, sight and sound) continue to operate within the range of acceptable tolerance so that the user receives continuing feedback while the tool is being operated. In addition, the gain of the falloff of speed or other feedback as the angular error increases can be made proportional to the currently selected tolerance.

Also shown in sighting screen 15 is a constant setting 356 with its corresponding on/off value 358. The constant setting, when actuated, causes the measured pitch and yaw values to be continuously displayed, such as shown at 360 and 362. These continuous displays alternatively, or additionally, may be displayed elsewhere, such as in feedback region 236. By continuously displaying the relative position of the tool with respect to a work piece, use of the tool as a level is facilitated.

Another mode of operation that the user may selectively utilize is what is referred to herein as step mode 252. Step mode 252 enables the user to selectively cause the work element to rotate up to a desired number of revolutions responsive to actuation of either trigger 50 or button 38. This includes not only a defined number of complete revolutions, but also fractions of a single revolution. For example, a defined number of complete revolutions may be useful when the user needs to drive a large number of identical screws. On the other hand, a limited number of revolutions, or portions thereof may be desirable when a user has driven a screw most, but not all, of the desired distance into a work surface.

Figure 16:
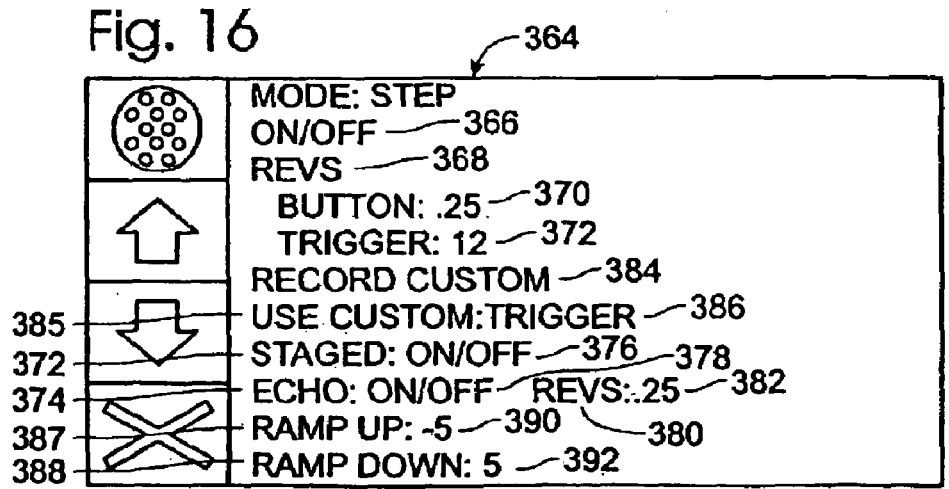
FIG. 16 is the user interface of FIG. 11 showing a step screen.

When step mode 252 is selected, step screen 364 is displayed in place of default screen 230. From the step screen, shown in FIG. 16, the user may selectively enable or disable the step feature with on/off setting 366. Step screen 364 also includes a revolutions (or revs) setting 368. Revs setting 368 enables the user to input at values 370 and 372 the maximum number of revolutions which work element 22 will be turned responsive to each actuation of either button 38 or trigger 50. For example, as shown in FIG. 16, every time trigger 50 is urged from its resting position, work element 22 will complete up to twelve revolutions. Upon return to its resting, unactuated position, trigger 50 may be reactuated to cause up to another twelve revolutions of the work element. Similarly, every actuation of button 38 will cause one fourth of a revolution of the work element.

Because trigger 50 is slidable between a range of positions, thereby controlling the speed of rotation of the work element or the torque applied by the work element, the above revs value for the trigger is a maximum number of revolutions. For example, if the user only slightly actuates the trigger in the speed mode, the work element will slowly start to rotate. With value 370 being twelve revolutions, work element 22 will continue to rotate at a speed indicated by the trigger until twelve revolutions are completed. At that time, the selected feedback mechanism(s) will automatically stop the rotation of the work element and/or indicate to the user that the desired number of revolutions have been completed. If the user returns the trigger to its resting position before the desired number of revolutions are completed, then the counter is reset. Unlike trigger 50, button 38 does not have such an easily controlled range of positions. Instead of causing up to a selected number of revolutions, actuating button 38 automatically causes the selected number of rotations every time the button is pressed.

Step screen 364 further includes settings entitled staged 372 and echo 374, each of which includes a corresponding on/off value 376 and 378. Staged setting 372 corresponds to the revolutions value 372, if any, inputted for trigger 50. Instead of completing up to the inputted number of revolutions upon actuation of the trigger, and then automatically stopping or otherwise indicating this fact to the user, staged setting 372 calibrates the number of revolutions inputted at revolutions value 372 along the range of positions of the trigger. As the trigger is actuated along this range of positions, a proportional number of revolutions will be completed, with no further revolutions (or portions thereof) being completed until the trigger is further urged along its path. This enables the user to control within a defined range (corresponding to value 372) the number of revolutions of work element 22 when the trigger is pulled, for example, to its half-way position.

As an illustration, with the twelve revolutions shown at value 372, pulling trigger 50 one third of its complete range of motion will cause work element 22 to complete four revolutions, and then stop. Further urging trigger 50 to its half-way position will cause work element 22 to complete two additional revolutions, and then stop again. When, and if, trigger 50 is urged to its fully actuated position, then a total of twelve revolutions will be completed. On the other hand, if the trigger is returned toward its resting (unactuated) position, no further revolutions will be caused. Returning the trigger to its resting position resets this range of traveled positions, and the user can again cause up to the number of revolutions inputted at value 372.

The staged function of the step mode can also be implemented so that additional revolutions can be obtained without completely releasing the trigger. In such an embodiment, if the trigger is pulled halfway and six revolutions are completed, the user may partially release the trigger to allow additional revolutions to be selected. Thus, with the trigger pulled halfway, if the user relaxes the trigger to a one-quarter pulled state, no additional revolutions will be completed, however, if the user then pulls the trigger back to the halfway state, three more revolutions will be provided. Similarly, this function can be implemented so that if the user relaxes the trigger prior to completion of the maximum selected number of revolutions, the chuck will stop when the trigger position reaches the position corresponding to the number of revolutions then completed.

Echo setting 374 causes work element 22 to repeatedly complete an incremental number of partial or complete revolutions as long as the trigger is held at its fully actuated position. Unlike the revolutions during conventional operation of a hand tool, the incremental revolutions (complete or partial) in the echo setting are spaced-apart by time delays. The delay does not need to be long, but should be of sufficient duration for the user to determine if further rotation is necessary. For example, a duration of anywhere in the range of approximately one-tenth of a second to five seconds are preferred, with a duration of less than approximately one second being most preferred.

As shown in FIG. 16, echo setting 374 includes an on/off value 378. In the on position, echo setting 374 causes a predetermined default amount of rotation for every time increment that the trigger is held in its fully actuated position after the selected number of revolutions determined by value 372 have been completed. This predetermined echo of rotation may be within the range of approximately one-thirty-second of a revolution to approximately two revolutions, with values of one eighth, quarter and half, a revolution being preferred. Alternatively, instead of a predetermined amount of rotation, the user may input a revs value which determines the amount of rotation per time increment that the trigger is held in its fully actuated position after the completion of the selected number of revolutions. This alternative setting 380 and corresponding value 382 are also shown in FIG. 16 for purposes of illustration. When step screen 364 includes a revs value 382 input, the on/off value 378 may be omitted, with the same result being accomplished with a revs value 382 of zero or non-zero. In addition, the time increment before and between echo revolutions could be selected by the user in place or in addition to the revs setting. In that case, the button step revolution value may also be used for the echo revolution value.

Sometimes a user does not know the desired number of rotations, but the user knows that he or she will need to drive a large number of identical screws. In such a situation, the user may determine the desired trigger revolutions value 372, such as through trial and error, or the user may utilize record custom setting 384. Record custom setting 384 measures the number of rotations of work element 22 during the recording period. When selected, the number of revolutions, as measured by internal feedback sensors and stored by controller 26, is determined by the complete operation (start through stop) of the tool. Controller 26 may also cause directions to be displayed on display 220 or played through speaker/microphone 229 to tell the user, for example, to position the tool and actuate the trigger to begin recording, with the recording stopped when the trigger is returned to its resting position. Upon completion, the user may be prompted to accept the recorded measurement, or to rerecord the measurement. It should be noted that the record custom operation may selectively also record the speed profile of the chuck as the revolutions are completed. Thus, in addition to the completing the same number of revolutions, the controller would cause the chuck to maintain the same speed profile as recorded in the sample run. For instance, it may be desirable to use a slow speed at the beginning and end of the revolutions, with a higher speed in between.

When the user records a custom number of rotations, the user also selects via "use custom" setting 385 and toggle value 386 whether this recorded number of revolutions is used for the trigger value or the button value. If used for the trigger value, then up to this recorded number of revolutions, at a speed selected by the trigger, are caused responsive to the trigger position. If used for the button value, then the measured number of revolutions and recorded speed profile are automatically caused when the button is depressed.

Also shown in FIG. 16 are ramp up 387 and ramp down 388 settings. These settings enable the user to selectively define the profile through which the speed of rotation or applied torque is added at the initial portion of the defined number of rotations (ramp up) or reduced at the latter portion of the defined number of rotations (ramp down). The values 390 and 392 of these profiles may be established profiles, such as high, low and medium values, or they may correspond to a relative range of profiles, such as those shown in FIG. 13.

In the embodiment described above, the rotational position of the work element in step mode 252 is positively controlled. Therefore, power will be supplied to the motor, up to any established maximum speed and torque settings, until the work element, such as chuck 28, completes the selected amount of rotation. This is in contrast to U.S. Pat. No. 5,754,019 (the disclosure of which is hereby incorporated by reference), which discloses applying a series of torque pulses after a predetermined threshold torque is reached. In such a system, the degree of rotation, if any, of the work element may vary, depending on such factors as whether the applied torque exceeds the required torque to rotate the work element, the amount of resistance encountered at each pulse, etc. Therefore, power will be applied to the motor in spaced-apart pulses, and it is the magnitude and timing of these pulses that is controlled, not the actual rotation of the chuck. The disadvantage of such a system is that no actual movement of the work element will occur when the applied torque is less than the load.

Although the various step modes described above are preferably implemented with positive rotation control, it should be understood that the various step modes of the present invention could also be implemented with incrementally applied torque. One of the benefits of a position sensor to detect rotation is facilitating positive revolution control, such as for the step mode, or for more direct control of speed in other modes.

Another mode of operation that the user may selectively actuate from default screen 230 is tap mode 254. Tap mode 254 is used when the user needs to tap threads in a work piece. When tapping a hole, dislodged pieces of the work piece tend to bind the tap unless these pieces are broken loose periodically by reversing the tap. Conventionally, the user manually operates a drill until the tool binds, or until the user decides the tool is likely to bind. At this point, the user stops the drill, reverses the direction of rotation of the tap, and operates the drill in this reverse direction while partially or completely withdrawing the bit from the hole to remove these unwanted pieces.

Figure 17:
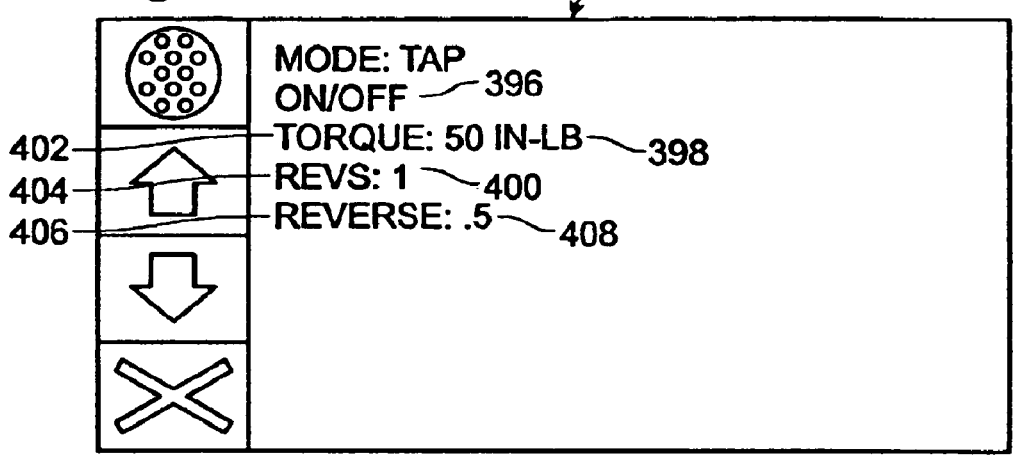
FIG. 17 is the user interface of FIG. 11 showing a tap screen.

Tap mode 254 automates this process through the selection of the maximum number amount of applied torque and maximum number of rotations in the forward direction before automatically reversing the direction of rotation for a determined number of revolutions. Upon selection of tap mode 254, default screen 230 is replaced by tap screen 394, which is shown in FIG. 17. Tap screen 394 includes an on/off setting 396 through which this mode of operation is selectively enabled and disabled. When enabled, the user may input values 398 and 400 for torque 402 and revolutions (revs) 404 settings to establish the values at which the tool reverses the direction of operation. The number of revolutions in this reverse direction may be selectively controlled by the user, such as with reverse setting 406 and user-inputted value 408 on screen 394. Alternatively, these values may be predefined. Between approximately one-quarter and approximately five revolutions will generally be sufficient for both the forward and reverse directions. Of course, it is within the scope of the invention that values outside of these exemplary ranges may be used, depending on the particular conditions encountered and a user's particular preferences.

Figure 18:
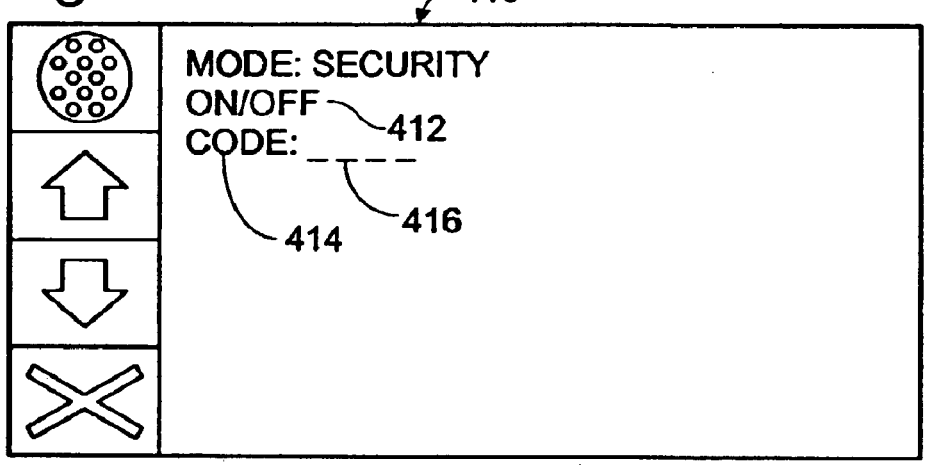
FIG. 18 is the user interface of FIG. 11 showing a security screen.

Another mode of operation is security mode 256. Security mode 256 enables the user to selectively lock, or prevent operation, of the tool until a passcode is supplied by the user. The likelihood of theft of tools including this feature will be substantially reduced relative to existing designs because the tool is useless without the required passcode. Upon selection of security mode 256, default screen 230 is replaced with security screen 410, which is shown in FIG. 18. Preferably, the controller 26 will not to deliver power to the motor unless the correct pass code is entered. Because bypassing the controller is difficult or impossible, there is little likelihood that a thief will be able to make use of a stolen tool.

Similar to many of the previously described screens, security screen 410 includes an on/offsetting 412 through which this mode of operation is selectively activated or deactivated. In addition, security screen 410 also includes a code setting 414, with a corresponding value or values 416, which correspond to the user's passcode or combination. This passcode may include a sequence of indicia, such as letters, numbers or other symbols, which are inputted by the user. In addition to scrolling through a series of possible indicia via arrow buttons 224 and 226, the values may be scrolled through responsive to the rotation of the chuck. Because the chuck may be rotated in both clockwise and counterclockwise directions, it provides a mechanism much like the dial on a combination lock, through which the user may selectively input indicia forming the user's passcode.

Figure 19:
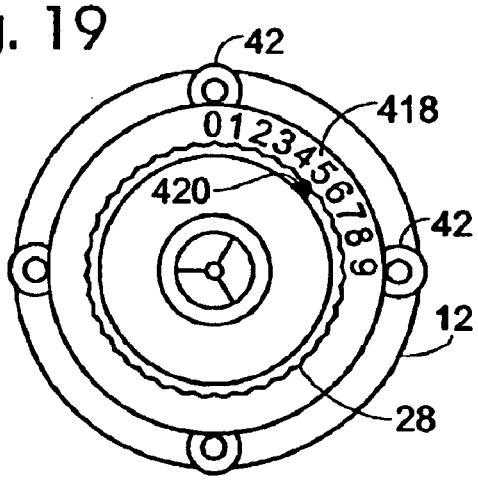
FIG. 19 is a fragmentary front elevation detail showing a portion of an embodiment of the chuck and body of the hand tool of FIG. 2.

In fact, the tool preferably includes markings on its body adjacent the chuck corresponding to the indicia input as values 416. As an example, in FIG. 19, a portion of body 12 and chuck 28 is shown. In FIG. 19, a plurality of indicia, in this case numbers 418, are shown adjacent chuck 28, and chuck 28 includes a pointer 420 which indicates the selected value. In FIG. 19, numerals 0–9 are shown, however, it should be understood that typically numerals or other indicia will extend at least substantially around the chuck, and that other ranges of values may be used. Because the tool includes internal feedback sensors that communicate the rotational position of the chuck to the controller, the controller can monitor the currently selected indicia, such as the numeral five shown in FIG. 19, or the relative rotation as described below. Similarly, upon either actuation of a button or the trigger, or upon rotation of the chuck in the opposite direction, the controller can accept the current value and begin scrolling through the range of indicia to be inputted next.

The locked configuration of the security mode may be selected in an active fashion, by pushing a corresponding button or activating the feature directly. Alternatively, the tool can have an inactivity time-out period after which the security mode is activated to lock the tool. For instance, if the tool is not operated for a period of time, such an hour, several hours, eight hours, etc., the security mode may be actuated. This time period may be predetermined, or selected by the user via a suitable user input. In addition, the security mode may be actuated any time the battery is removed and replaced, either with the same battery or a different battery. By selection of the appropriate triggering event, the theft deterrent effect can be achieved with minimal impact on the authorized user.

It should be noted that some variable speed tools are provided with a mechanical high-speed bypass of the electronic speed control for full speed operation. It may be preferable to eliminate this feature when implementing a security mode. However, it is also possible to allow the high-speed bypass to remain, while the controller simply disables variable speed operation. The significant loss of utility created by lack of variable speed operation should provide discouragement to most potential thieves.

In the embodiments of security mode 256 described above, the tool is rendered inoperable after a either period of nonuse, removal of power source 24, or manual actuation of the security mode by the user. To make the tool usable again, the user has to enter a passcode, which enables the tool to operate until another one of these triggering events occurs.

It is also within the scope of the present invention that security mode 256 may define a period of operability, instead of, or in addition to, the period of inactivity described above. By this it is meant that upon actuation of the security mode, such as by entry of the user's passcode, the tool will be usable for a determined maximum interval. This interval may be in units of any selected value that may be monitored by a counter to determine whether a defined maximum value has been exceeded. Examples of suitable intervals include, but are not limited to, time periods, such as days, hours or minutes, revolutions of work element 22, battery cycles, and actuations of trigger 50. For purposes of discussion, the interval will be discussed as units of time, and more particularly as hours measured from when the user's passcode is entered.

By referring back to FIG. 18, security screen 410 can be seen to include several settings and values specific to this embodiment security mode. As shown, these settings include a units setting 530, a maximum value setting 532, and power and idle disconnect settings 534 and 536. Also shown in FIG. 18 is an elapsed units indicator 538. Units setting 530 enables a user to select at value 540 the particular units to be monitored by the counter. As discussed above, examples of suitable units are hours, days, revolutions, battery cycles and actuations of the trigger. Once the user has selected the units to be used by the counter, a maximum value 542 is entered to define the maximum number of the selected units that may be counted before the controller disables the operation of the tool.

From screen 410, the user also may select, via power disconnect setting 534 and its corresponding on/off value 544, whether the controller will cause the tool to be disabled every time the tool's power source, such as battery 54, is disconnected. For example, the user may prefer to be able to remove and replace battery 54 without having to reenter the user's passcode, which will also reset the counter. Idle disconnect setting 534 may be used in a similar manner to cause the controller to disable the operation of the tool if the tool has been idle for a defined time period, which is entered at value 546. It should be understood that a value of zero at 546 would indicate that the idle disconnect is not being utilized. When the power and idle disconnects are not selected, then the tool will remain operational until the maximum value is reached. When either of these disconnects is selected, then the tool will remain operational until either maximum value 542 is reached, or until either disconnect is triggered.

Elapsed units indicator 538 displays at 548 the number of the selected units which have occurred, or elapsed, since the user's passcode was entered. It should be understood that value 548 is displayed in the same units selected with units setting 530. As configured in FIG. 18, the counter measures the hours that have passed since the user's passcode was entered, and the tool will be rendered inoperable by the controller either when twenty-four hours have elapsed or when the tool has been idle for two consecutive hours. As shown, six and one-half hours have elapsed since the user's passcode was entered, and the tool has been idle for two consecutive hours.

When a tool includes security screen 410 with the settings discussed above, entry of the user's passcode should be required before allowing settings 530–536 to be adjusted. For example, upon toggling to the security screen, the user would enter passcode 416 and then selectively adjust the values 540–546 corresponding to settings 530–536. It should be understood that any of these settings, values and indicators may be preprogrammed into controller 26, and therefore not selectively configurable by the user. Similarly, any of these values may be inputted via interfaces or inputs other than the security screen shown in FIG. 18. Also, not all of these settings and indicators are required to implement this embodiment of security mode.

Figure 26:
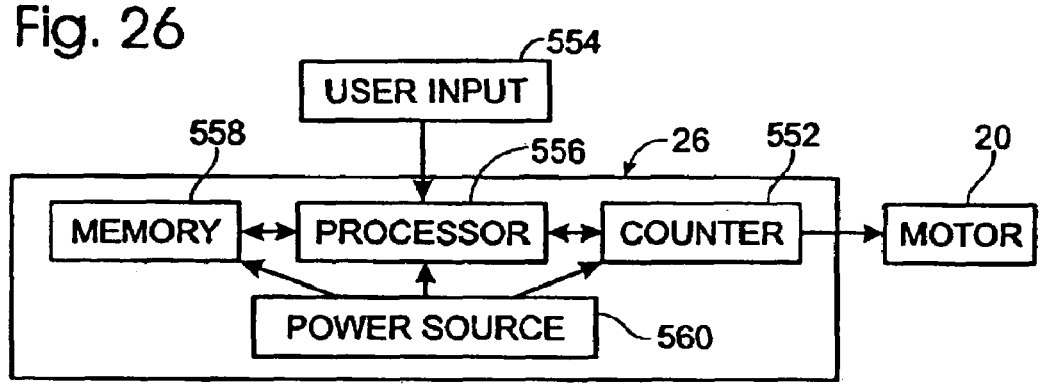
FIG. 26 is a schematic diagram of an embodiment of the security mode.

A schematic diagram for this embodiment of security mode 256 is shown in FIG. 26 and generally indicated at 550. As shown, the previously described controller 26 and motor 20 from FIG. 7 are shown. For purposes of illustration, the other elements of FIG. 7 have not been reproduced in FIG. 26. It should be understood, however, that the security mode may be implemented without requiring all of the elements shown in FIG. 7. In FIG. 26, the controller is shown including a counter 552 that is started when the user's passcode is inputted via any of the user inputs described herein, which are generally indicated at 554. Any of the other values described above may also be entered through a suitable user interface, such as security screen 410, to the controller's processor 556. The selected or preprogrammed maximum value is stored in the controller's memory 558, which preferably includes a non-volatile portion so that the maximum value is not lost from memory when the tool is disconnected from power source 24.

As shown, the controller includes a power source 560 that is separate from the primary power source 24 of the tool, and which may be used to provide power to any or all of counter 552, processor 556 and memory 558. Power source 560 will typically be a battery, such as used with watches, cameras or the like. Power source 560 may also include a capacitor charged by power source 24. At a minimum, power source 560 should provide power to counter 552 so that the counter continues to operate even if the rest of the tool is disconnected from primary power source 24. Even if no other portion of the controller is powered by power source 560, the security mode will continue to operate. Upon reconnection of the tool with power source 24, the controller, namely processor 556, will determine if the counter has exceeded the stored maximum value. If so, the tool will be disabled until the user's passcode is entered. When memory 558 does not include a non-volatile portion in which maximum value 542 is stored, then power source 560 should also provide power to memory 558.

Once the user's passcode is entered, counter 552 begins monitoring the number of the selected units that have occurred, or elapsed, since the passcode was entered. Processor 556 compares the measured units to the maximum value stored in memory 558 to determine if this maximum value has been exceeded. When this occurs, the controller disables the operation of the tool, such as by controlling its electronic speed control to prevent the delivery of power to the motor. Counter 552 or processor 556 may also monitor the time during which the tool is idle and compare this measured idle time to a selected maximum idle time stored in memory 556. Every time the trigger is actuated or the tool is otherwise used, the idle time resets to zero. Similarly, if the user's passcode is reentered once the counter is started, then the counter is reset. If battery 54 is disconnected from the tool or if the battery exhausts its charge, a signal is sent to processor 556. If power disconnect 534 is in its on mode, then the processor disables the tool until the user's passcode is reentered.

An example of a situation where this embodiment of security mode 256 may be desirable is when tools must be checked out from a tool crib, or other central depository. In such a situation, the person checking the tools out to others can actuate the security feature to start the counter, and thereby define the maximum operable time period for the tool, without having to give a passcode to the user. Therefore, if the user keeps the tool, rather than returning it to the crib, the tool becomes inoperable after expiration of the maximum operable interval and the user lacks the passcode required to render the tool operable again. Therefore, theft by employees, subcontractors and temporary employees is deterred, in addition to theft from others.

Both embodiments of security mode may be implemented concurrently. When this occurs, entry of the user's passcode will define the start of a maximum operable interval during which the tool may be used without requiring reentry of the user's passcode. However, if a defined period of nonuse elapses or if the tool's power supply is removed or exhausted, then the passcode would have to be reentered even though the maximum operable interval has not expired.

When any embodiment of security mode 256 is used, the tool preferably includes prominent security indicia on its housing to signal to potential thieves that the tool includes a security feature that will render the tool inoperable unless the required passcode is known. An example of such an indicia is shown in FIG. 27 and generally indicated at 562. It should be understood that the size, placement and shape of indicia 562 may vary, however, it should be or suitable size and position that would be thieves will notice the indicia and thereby be deterred from stealing the tool.

Counter 552 may also measure one or more cumulative operational values for the tool and store these values in a non-volatile component of memory 558. For example, the counter may measure such values as the total number of revolutions of the work element, the total hours (or other time unit) of operation, the total number of times the trigger is actuated, the total number of amp-hours used, and the total battery cycles. Any of these values may be used for warranty purposes by the manufacturer of the tool. Because some users rarely use their tools, while others use their tools for dozens of hours each week, it is currently difficult for manufacturers to have a warranty fair to all users. Furthermore, a timer that starts running upon first operation of the tool by a use can provide verification of the age of a tool for determining warranty coverage.

Typically only the date a particular tool is manufactured is known. Sometimes the purchase date may also be known. Regardless, trying to warranty the performance of the tool for a defined time period from the purchase or manufacturing date may be unfair to users that only occasionally use their tool, or only use it for light duties, because the warranty period will be typically be determined as an average value based on the theoretical average user. Therefore, too long of period will be given for some more-frequent, heavier-duty users, while too short of period will be given for less-frequent, lighter-duty users. By measuring and storing a cumulative operational value of the tool, it is now possible to issue a warranty that is fair to all users, regardless of the time period needed for the user to reach the warrantied value. For example, the performance of the tool may be guaranteed for such values as one million revolutions of the work element, or 1000 hours of use, or 5,000 amp-hours.

Another selective mode of operation shown in FIG. 11 is chuck hold mode 258. Chuck hold mode 258, with its corresponding on/off setting 422, enables the user to selectively determine whether chuck 28 is held stationary or freely rotatable when the drill is not operating. With chuck hold mode 258 deactivated, the chuck may be rotated manually by the user in either the clockwise or counter-clockwise direction when the chuck is not being electronically driven as in conventional drills.

However, sometimes it is desirable to be able to use the tool in a manner similar to a non-powered tool. When chuck hold mode 258 is actuated, the controller, by virtue of an electronic chuck control, actively holds the chuck in place when the trigger is not actuated. The controller locks or holds the chuck in place by applying a torque to the chuck to counteract whatever initial rotation is sensed when the trigger is not actuated. As previously described, the controller typically monitors rotation of the chuck by tracking rotation of the motor, the chuck or some component in the drive train. Thus, if the controller detects a spontaneous rotation, it can counteract the rotation by engaging the motor up to the level of the maximum available torque.

By way of example, the chuck lock mode allows a user to manually adjust the final depth of installation of a screw after the trigger is released by rotating the body of the drill. With the chuck locked, the drill essentially becomes a manual screwdriver allowing the user to impart an additional fraction of a revolution with much finer control than could be accomplished by activating the motor using the trigger with existing drills. Of course, the above described step mode offers similar functional benefits. The chuck lock mode also simplifies installation and removal of bits from the chuck because the user can simply turn the shell of the chuck by hand to tighten or loosen the jaws of the chuck. Without the chuck hold, the user would have to grip the base of the chuck with one hand while rotating the shell with the other, which can be awkward for the user.

Also shown in FIG. 11 is voice recognition mode 260 with its corresponding on/off setting 424. When a tool includes this mode of operation, controller 26 includes a voice recognition processor that enables the user to select any of the above modes of operation and input any of the above user inputs via speaker/microphone 229. Controller 26 receives these voice commands and converts the audio signals into electronic commands, similar to those received via actuator 50, button 38 or any of the other user-input buttons described herein. The disclosures of the following U.S. Patents are hereby incorporated by reference to provide examples of suitable mechanisms and systems for voice-recognition interfaces for electronic devices: U.S. Pat. Nos. 5,247,580, 5,255,326, 5,267,323, 5,749,072, 5,774,859, 5,809,471. One benefit of the voice recognition feature is that can enable many of the features described herein to be implemented without a user interface display, thereby potentially eliminating the associated cost.

Yet another mode of operation which may be selected from default screen 230 is pressure-activated torque mode 262, with its corresponding on/off setting 426. This mode may also be referred to as push mode. This mode of operation enables the torque applied by work element 22 to be selectively controlled by the pressure the user exerts on tool 10. Therefore, as the user exerts greater force upon the tool, the applied torque is commensurately increased up to a determined maximum value, such as may be established from trigger mode 246 or by manual torque control 30. The user-applied force may be measured by the force exerted upon work element 22, as sensed by transducer 219. Alternatively, the tool may include a force-sensing region, such as the pad shown at 221 in FIG. 9 on the rear surface 136 of the housing. Such a pad may also be located on body 12, handle 16, or in any other suitable location on a tool.

The user-applied force may be measured by the force exerted upon work element 22 as sensed by a transducer, such as transducer 219 in FIGS. 9 and 10. For a drill like the one shown in FIG. 1, a transducer 219 may be positioned between a motor 20 and a gear box 620, as shown in FIG. 27. Alternatively, the tool may include a force-sensing region, such as the pad shown at 221 in FIG. 9 on the rear surface 136 of the housing. Such a pad may also be located on body 12, handle 16, or in any other suitable location on a tool. The measured value of the user-applied force may then be used to control the torque applied by work element 22, such as by regulating the supply of power to motor 20, as explained above.

Figure 28:
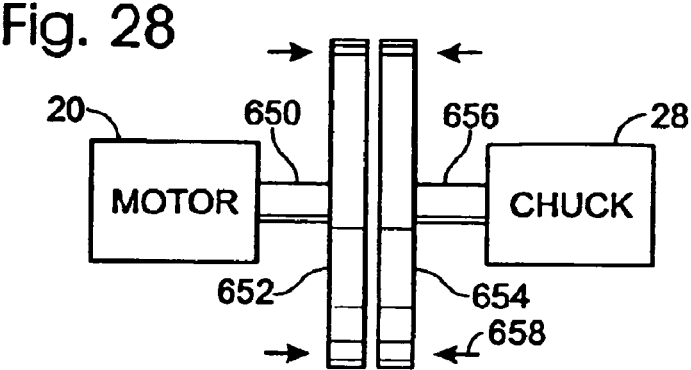
FIG. 28 shows a mechanical configuration to control torque according to the force applied by a user to a tool.

A mechanical arrangement also may be used to control the torque according to a user-applied force. A simple illustration of this is shown in FIG. 28. A motor 20 is shown driving a shaft 650. A disc 652 is fixed to the end of shaft 650. A second disc 654 is attached to a shaft 656 that turns a chuck 28. Pushing disc 652 in the direction of arrow 658 causes the disc to contact disc 654. Friction between the discs then causes disc 654, shaft 656 and chuck 28 to rotate. The friction between the discs is proportional to the force with which disc 652 contacts disc 654, so the harder a user pushes, the greater the torque applied to the chuck. In this embodiment, the discs are made from any suitable material, such as a hard plastic. Preferred materials have a dynamic sliding frictional coefficient that is similar to the static coefficient to avoid abrupt transitions in torque.

Figure 29:
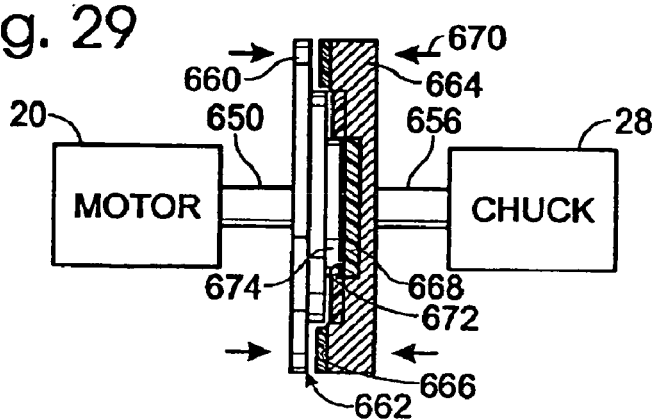
FIG. 29 is another embodiment of controlling torque by applying force to a tool.

Another embodiment is shown in FIG. 29. Again, a motor 20 drives a shaft 650, and a disc 660 is fixed to the end of the shaft. Disc 660, however, includes a stepped surface 662 instead of a flat surface. A disc 664 is attached to shaft 656 and chuck 28. Disc 664 includes a surface 666 with recesses configured to mesh with the steps on surface 662 of disc 660, and deformable material 668 is positioned within the recesses. Pushing disc 660 toward disc 664, in the direction of arrow 670, causes the steps to contact the deformable material in the recesses. That contact creates friction, which, in turn causes disc 664, shaft 656 and chuck 28 to rotate.

The steps on disc 660, the recesses in disc 664, and the thickness of the deformable material are sized so that the contact between the discs increases as more force is applied. For example, disc 664 includes a center recess 672 filled with deformable, elastomeric material, and disc 660 includes a center step 674. When disc 660 is pushed toward disc 664, center step 674 contacts the deformable material in center recess 672, creating friction and torque. However, the other steps and recesses are configured so that they do not yet contact each other. As a user pushes disc 660 further, step 674 deforms or compresses the material in recess 672, and disc 660 moves closer to disc 664 until another step contacts the deformable material in a corresponding recess, creating additional friction and torque. Pushing disc 660 still further toward disc 664 compresses the deformable material further, and another step contacts disc 664 creating still more friction. Of course, different numbers of steps and recesses may be used. The torque applied to shaft 656 increases as steps that are radially further away from shaft 656 contact disc 664 because the torque is the product of the force and the distance between the line of action of the force and the axis of rotation. This arrangement provides a progressive or exponential increase in torque with pressure rather than a linear increase as occurs in the first described embodiment.

Figure 30:
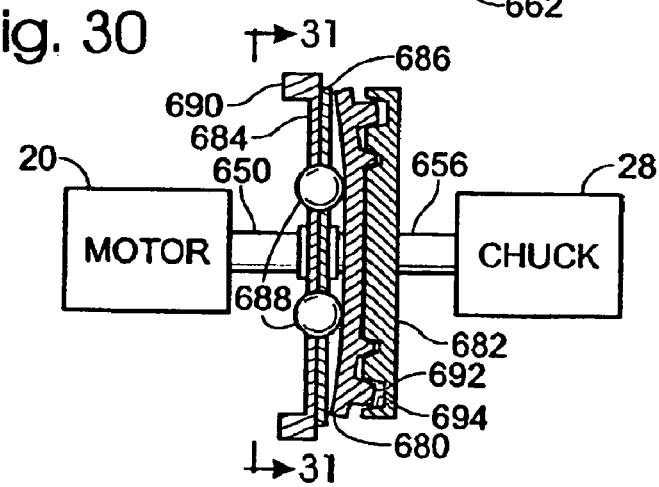
FIG. 30 shows yet another embodiment of controlling torque by applying force to a tool.
Figure 31:
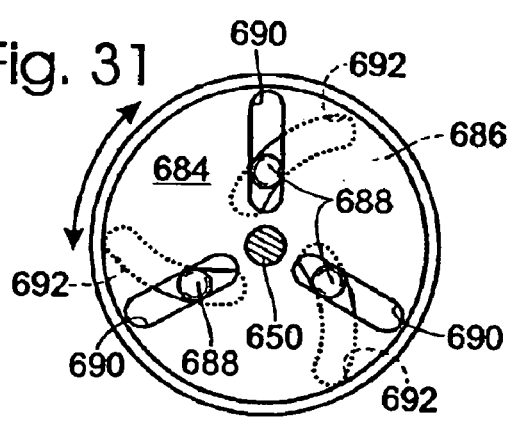
FIG. 31 shows a part of the embodiment of FIG. 30.

Another mechanical embodiment of a system to provide torque corresponding to the force applied by a user is shown in FIGS. 30 and 31. A motor 20 rotates a shaft 650, which in turn rotates a somewhat flexible disc 680. Disc 680 contacts a disc 682 mounted on shaft 656 to chuck 28. As shaft 650 turns, friction between discs 680 and 682 causes shaft 656 and chuck 28 to rotate. In this embodiment, the periphery of disc 680 curves away from disc 682, as shown. The periphery of disc 680 curves away from disc 682 so that the periphery may be selectively brought into contact with disc 682 to increase the proportionality constant between the pressure applied and torque transferred to the disc. The proportionality constant changes because, for a given pressure or normal force, the torque transferred will be proportional to the radial distance from the axis where the force is transferred.

The embodiment shown in FIG. 30 includes discs 684 and 686 mounted on shaft 650. Shaft 650 passes through discs 684 and 686 in such a way that the shaft may turn without rotating discs 684 and 686. However, discs 684 and 686 are mounted on shaft 650 so that they are held at a fixed position along the shaft; the discs may not move along the length of the shaft. Additionally, discs 684 and 686 are mounted on shaft 650 so that the discs may rotate relative to each other. Discs 684 and 686 hold a plurality of bearings 688 against disc 680. In FIGS. 30 and 31, bearings 688 are shown as ball bearings, but any other suitable bearing may be used. The bearings push against disc 680, but allow disc 680 to rotate relative to discs 686 and 684. The bearings are mounted in slots 690 and 692 in discs 684 and 686, respectively. The slots are shown in FIG. 31. Slots 690 extend radially outwardly in disc 684, while slots 692 curve outwardly in disc 686, as shown. Slots 690 and 691 are configured so that the bearings move outwardly or inwardly in the slots when discs 684 and 686 rotate relative to each other. For example, as disc 684 in FIG. 31 is rotated clockwise relative to disc 682, bearings 688 move outwardly in slots 690 and 691. In FIG. 31, the bearings are shown further outward from shaft 650 than shown in FIG. 30.

In FIG. 30, disc 686 is held stationary, and disc 684 is rotated relative to disc 686 by a gear 690 that meshes with splines or ridges on the edge of disc 684. Gear 690 is positioned partially outside a tool housing so that a user may move the gear by gripping and rotating it. Rotating gear 690 causes disc 684 to rotate relative to disc 686, thereby moving bearings 688 inwardly or outwardly. If the ball bearings are moved outwardly, they push the periphery of disc 680 against disc 682, thereby increasing the pressure/torque proportionality constant.

As shown, the peripheries of discs 680 and 682 also include tapered and meshing annular extensions and recesses, such as extension 692 and recess 694. When the periphery of disc 680 is pushed against the periphery of disc 682, the tapered extensions move into the recesses in disc 682. The extensions and tapers should be configured so that the extensions will slide in the recesses without locking in place, but they should be configured so that there is friction between the extensions and recesses. That friction will increase the pressure/torque proportionality constant more than occurs by virtue of moving the transfer point further from the axis. Extension 692 may be longer and recess 694 may be deeper than the next most inward extension and recess. Additionally, the taper of extension 692 and recess 694 may be more steep than the taper of the next most inward extension and recess. Each of these details further increases the change in the proportionality constant above and beyond the linearly increasing radial contact point. Various numbers of extensions and recesses may be used, including discs with no recesses and/or extensions. Other friction enhancing devices may be used instead of or in addition to tapered extensions and recesses. For example, the contacting surfaces on the peripheries of discs 680 and 682 may be roughened to increase the friction between the discs.

Figure 32:
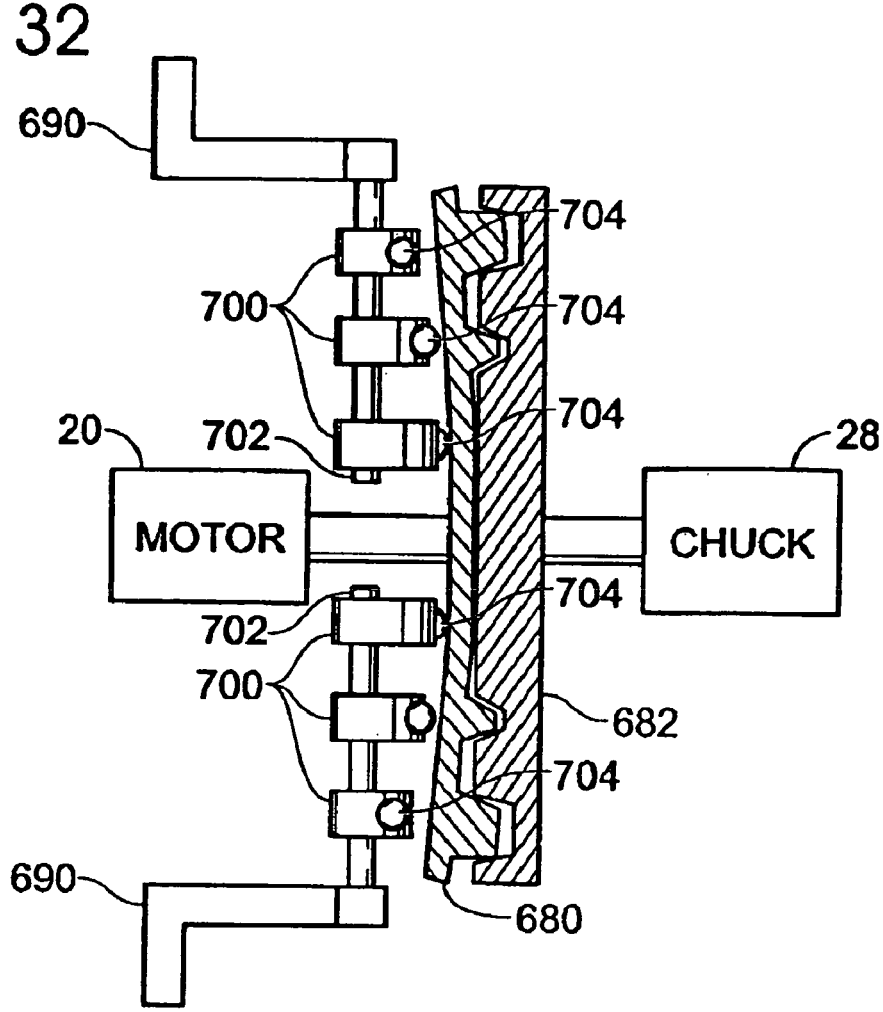
FIG. 32 shows an embodiment that uses cams to control torque.
Figure 33:
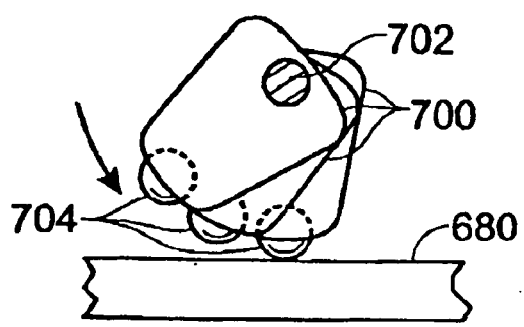
FIG. 33 shows a part of the embodiment of FIG. 32.

FIGS. 32 and 33 shown another embodiment of a system to provide torque corresponding to the force applied by a user to a tool. This embodiment is similar to the embodiment shown in FIG. 30, except that this embodiment uses a series of cams to push the periphery of disc 680 against disc 682. Three cams are shown at 700, mounted on a shaft 702. Shaft 702, in turn, is mounted to the housing of the hand tool. Cams 700 hold ball bearings 704 against disc 680. The cams may be rotated, as shown in FIG. 33, by turning shaft 702 so that the ball bearings push disc 680 against disc 682. Shaft 702 may be rotated by a lever 690 that extends from the shaft. FIG. 32 shows two sets of cams, but one or more sets may be used. Additionally, the sets may include various numbers of cams, including more or less than shown in FIGS. 32 and 33.

One benefit of push mode 262 is that it prevents stripping of screw heads where the torque applied exceeds what can be transferred to the screw without causing the bit "cam out," where the bit is pushed out of the screw head. Once the bit is pushed out of the screw head, the bit usually starts to spin rapidly, thereby quickly augering out the drive recess in the screw. Although the rate delay at which the speed increases, as described above, partially addresses this problem by limiting rapid speed changes, it does not eliminate the problem of excess torque relative to the axial force being applied between the bit and the screw head.

Figure 20:
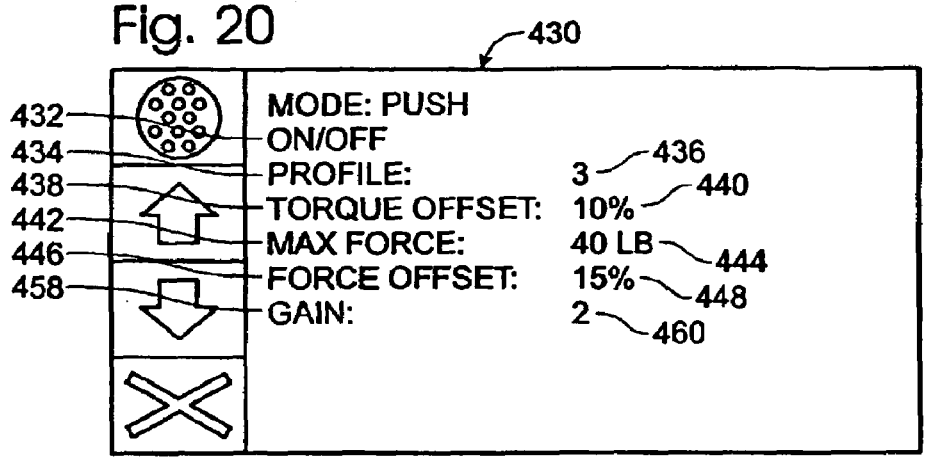
FIG. 20 is the user interface of FIG. 11 showing a push screen.

Upon selection of push mode 262, default screen 230 is replaced by a push screen 430, depicted in FIG. 20. Push screen 430 allows the user to select a predefined relationship between the maximum torque that will be applied to the chuck, as set in the trigger mode, and the axial pressure or force being applied to the screw. The push mode screen is similar to the trigger mode, except that the torque curve is adjusted as a function of the applied force rather than as a function of trigger position. Otherwise the available adjustments are the same. In particular, an on/offsetting 432 allows the user enable or disable the push feature. A profile setting 434 having a user value 436 allows the user to select the curve or profile relating the torque output as a function of force applied. The curve relating torque to pressure can be changed from exponential to linear to inversely exponential by selecting a negative, zero or positive value, respectively.

A torque offset setting 438 having a user input value 440 allows the user to select the initial torque value for threshold applied force. When driving a screw with a drive socket that does not tend to push the bit out of the screw, such as a hex or square drive, it may be desirable to allow some torque to be applied even with no axial force. A max force setting 442 having a user selectable value 444 allows the user to determine the full-scale force required to reach the maximum available torque. A force offset setting 446 having a user input value 448 allows the user to select a force threshold which prevents any torque from being applied until the threshold force has been achieved. In other words, if the max force value is forty pounds, and the force offset is ten percent, no torque will be applied until the axial force reaches four pounds. At this point the torque applied will start at a level determined by the torque offset.

Figure 21:
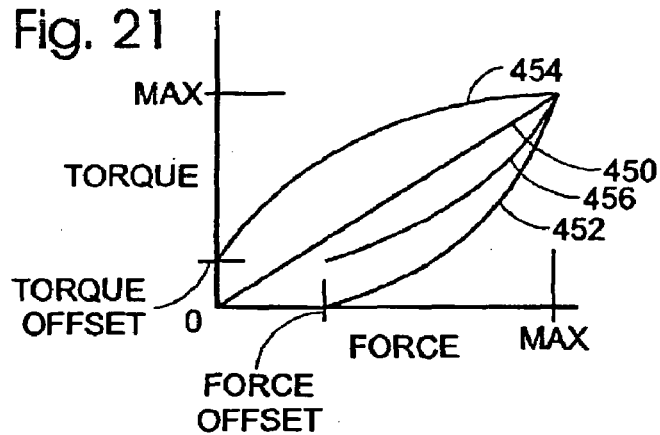
FIG. 21 illustrates various types of push profiles available.

FIG. 21 illustrates various types of push profiles available. The force/torque curve for zero force and torque offset and linear profile is illustrated at 450. In this case torque is linearly dependant on push from zero to maximum. Curve 452 illustrates the effect of a force offset with zero torque offset and an exponential profile. Curve 454 illustrates the effect of a torque offset with zero force offset and a inversely exponential profile. Curve 456 illustrates having both torque and force offsets and an exponential profile. In such a situation, no torque is applied until the threshold force is reached, at which point the torque jumps to the offset value.

In push mode, the operator typically places the bit lightly against the screw and depresses the trigger. Unless there is a torque offset, no torque will be supplied to the chuck and therefore no rotation will occur until the threshold force is applied. As the user begins to press against the screw, the rotation starts, with the torque being limited to a maximum value determined by the current pressure. By selecting a proper curve and maximum torque, it is possible to partially or completely eliminate the problem of the bit being pushed out of the screw head. By using the push mode, a user can control the driving of a screw by how hard they push on the drill, effectively "pushing" the screw into the work piece.

As with the trigger mode, there will be a gradual transition between zero speed and the speed set by the trigger which is dependant on how much the axial pressure or force exceeds the currently required minimum for the torque being utilized. The relationship between excessive force and speed is determined by a gain setting 458 with a setting 460, similar to that described for the trigger mode. The position of the trigger can be utilized to select a desired maximum speed at any given time.

It should be understood that the previously described screens, user input controls and related options have been presented as non-limiting examples of possible screens, controls and options, each of which may be used with any of the embodiments of the tool (tools 10, 90 and 130) described herein or with other portable power tools. Similarly, each particular function may be used alone or with other functions and the order, display and grouping of functions and screens may vary without departing from the scope of the invention. For example, the display illustrated in the figures is sized to include multiple lines of text, as well as the battery and feedback regions. A smaller display may only include a single text line, in which the various settings are incrementally displayed.

Figure 22:
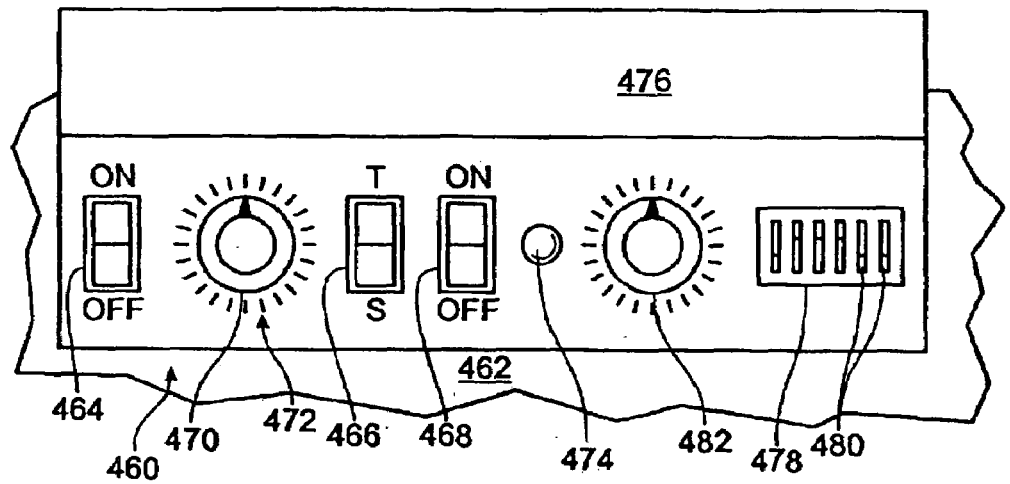
FIG. 22 is a fragmentary detail of a portion of the body of a tool according to the present invention and showing a plurality of user inputs, including switches and dials that are adapted to selectively enable and configure operative modes and settings disclosed herein.

Additionally, many of the modes of operation and settings discussed herein may be implemented without requiring a user interface with a visual display. As an example, in FIG. 22, a plurality of user-operable controls are generally indicated at 460 on the body 462 of a tool. This tool may be any of the previously described hand tools, such as tools 10, 90 and 130, or may be any other type of conventional hand tool described herein in which it is desirable to implement one or more of the modes or settings of the present invention. In FIG. 22, three controls are shown at 464, 466 and 468 in the form of switches, however, it should be understood that other manually operable controls, such as buttons, dials, slides, etc. may be used. Also, it should be understood that as few as one or two controls may be used, and as many as necessary to implement and allow the user to select among the desired number of features. A DIP switch block 478 is shown with six individual switch 480. Use of a DIP-type switch block allows many different options to be selected in a relatively compact space. Individual switches can be used to turn various features on or off and select between various levels.

As an example, echo setting 374 may be implemented via switch 464. By toggling between the on and off values of the switch, the user can selectively enable and disable echo setting 374. In such an implementation, a predefined value, such as one-quarter or one-half of a revolution per second may be used. Alternatively, rotary dial or multi-position dial or slide may be used to select this value. An example of such a dial is also shown in FIG. 21 at 470 and includes indicia 472 surrounding the dial to reflect particular values that may be selected using the dial. In FIG. 22, indicia 472 are illustrated as hatch marks, however, any suitable symbols, numbers, letters, etc. may be used.

Another example of a feature, or mode, of the present invention that may be implemented without requiring a user interface with a visual display is push mode 262. For example, switch 466 may allow the user to selectively enable push mode 262. As such, toggling the switch between on and off settings selectively enables and disables push mode, with a predefined maximum applied torque and ramp profile. Alternatively, one or more dials, such as dial 482 can be used to set a maximum torque or select an appropriate profile.

Trigger mode 242 may also be implemented with a single switch, such as switch 468. In such an implementation, the two positions of the switch enable a user to select between the trigger controlling speed or applied torque. Dials or controls can be provided to enable selective control of ramp profiles and maximum values. Alternatively, a standard, predefined ramp profile and predefined maximum values can be used. Chuck hold and voice modes 258 and 260 may also be controlled with on/off switches.

In the case of a drill or driver with a rotary chuck, or other tool with a rotary output, security mode 256 does not necessarily even require a switch to be implemented. Because rotation of the chuck may be used, as described herein, to selectively input a user's passcode or combination, the user can simply use the chuck to enter this code whenever required. Alternatively, an on/off switch may be used to enable the user to selectively engage the security mode by selecting the on position of the switch. Of course, in such an implementation, moving the switch to its off position will not disengage the security mode. Instead, the user's passcode must be entered. Also, a light or audio signal may be used to indicate to the user that a passcode must be entered to disengage the security mode. An example of such a light is shown in FIG. 22 at 474. A speaker has previously been illustrated at 229, and alternatively a buzzing or other tone may be selectively emitted from internal the tool's housing.

It should be noted that rotation of the chuck may be sensed by monitoring rotation of the motor. Monitoring rotation of the motor generally provides greater accuracy because of the gear reduction that typically occurs between the motor and the chuck. Thus the motor may turn ten times for every revolution of the chuck. However, as a consequence, if the gearing skips or a manual chuck is utilized, there may be no direct positional correlation between the position of the motor and the position of the chuck. As a result, rotation of a pointer on the chuck to a specific combination number on the housing may not be directly detectable. Rather only the subsequent relative rotation of the chuck may be determined. Therefore, the passcode or combination may be detected by the controller only as a series of relative positions, such as a rotation of 420 degrees clockwise, followed by a rotation of 90 degrees counterclockwise, followed by a rotation of 30 degrees clockwise. When the controller detects this pattern of rotation the tool can then be unlocked.

In addition, a sensor configured to detect relative movement is generally much simpler than one capable of tracking absolute position. For example, one or more magnets attached to a rotating component of the drive train can be detected by a hall-effect sensor to detect relative movement. Similarly, relative rotation can be detected providing a rotating member with perforations that periodically pass a beam of light that can be detected by a photo-diode or phototransistor. For example, a slotted optical switch, such as a Motorola H21A can be positioned in the motor to count passing perforations formed in the motor cooling fan. The rotation of the motor may also be tracked by monitoring the electrical leads to the motor. In particular, the movement of the brushes from plate to plate on the commutator generates noise on the motor leads which can be detected to measure motor rotation.

When security mode is implemented on tools without a rotary chuck or equivalent structure for manually inputting a passcode, a rotary dial, such as the previously described dial 470 with indicia 472 may be used to enter this code. Even a single button could be used to detect a predetermined pattern of actuation, similar to Morse code. Also, the sequence and/or number of times at which at least two buttons are sequentially pressed may be used to input the passcode. As yet another alternative, the user may sequentially actuate the trigger for a determined sequence of time periods, which define passcode. In this configuration, the tool may emit periodic beeps or other audible or visual signals to enable the user to measure the passing of time. By way of example, a user's passcode may be sequentially actuate the trigger, or other user input, for periods of five beeps, then seven beeps, then three beeps. These configurations are particularly useful when the tool (for example, a saw or sander) does not include a rotatable chuck that may be used to scroll between sequences of indicia. In any case, the combination or password associated with the tool would typically be included with the tool at the time of purchase, just like the combination for a combination lock. An advantage of the above-described display is that it is possible for a user to select that user's personalized code.

Instead of requiring the user to manually enter the user's passcode, the passcode may be transmitted to the controller via proximity or contact with a security station that is normally maintained separate from the tool. An example of such a station is schematically illustrated in FIG. 27 at 570. For example, station 570 may be housed within the charger for battery 54, or retained on a key fob (much like the remote controller for a vehicle's alarm), or incorporated into another handheld unit. Station 570 is programmed to transmit a passcode to controller 26, which in this embodiment includes a receiver adapted to receive the passcode from the station. For example, the station may transmit the passcode through a direct linkage 572 to the controller, such as through a patch cord, or socket that connects the station to the controller. Alternatively, the station may transmit this code via any suitable method of wireless communication, such as those discussed above with respect to FIG. 5, and indicated generally in FIG. 27 at 574. Station 570 may be used with any of the embodiments of the tool described herein, including other portable tools in which the security mode may be implemented, such as portable saws and air compressors.

An advantage of using such a station for actuating the security mode is that it removes the requirement that the owner of the tool remember the passcode required to actuate and deactivate the security code. It also removes the concern that someone other than the owner or authorized user of the tool will learn the passcode and thereby be able to steal and continue to use the tool. Instead, the owner simply needs to retain the station in a safe location, such as at the owner's house, on the owner's key chain, in the tool crib where the tools are stored after use, etc. Because the station will not be retained with the tool when the tool is in use, theft of the tool will render the tool inoperable after a period of time and the thief will lack the station, which is preferably specific to a particular tool, required to deactivate the security mode and render the tool operable again. Also because the passcode is not readily apparent, even with possession of the station, a tool and its corresponding station may be loaned to others without the owner worrying about someone else learning the owner's passcode.

As shown in FIG. 22, the switches and dials are recessed within body 462 and selectively enclosed by a cover 476. Cover 476 prevents unintentional operation of and protects the switches and/or dials, such as when the tool is in operation. However, the switches may be used without a cover and/or without being recessed within the housing.

Figure 23:
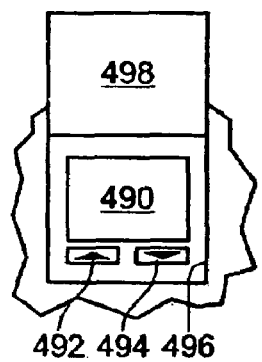
FIG. 23 is a fragmentary detail of a portion of a portion of the body of a tool according to the present invention and showing a display and a pair of user-inputs within a recess in the body that is selectively closed with a cover.

An alternative user interface shown in FIG. 23 and includes a small display 490 and user input buttons 492 and 494. Display 490 is preferably small enough to be located in a recess 496 located in the housing of a tool and covered by a hatch 498. In the case of a small display, the buttons would typically be used to step through the various available modes, such as by pushing both buttons simultaneously. Once the selected mode or parameter was displayed, the individual buttons, or the chuck or trigger, can be used to select a particular value or turn a feature on or off. Display 490 has the advantage of being smaller and therefore more economical. In addition, because of its small size, it is relatively easy to protect against damage, such as by hatch 498.

In the Figures discussed above, Applicants' hand tool has been illustrated as an electrically powered drill. It should be understood that Applicants' invention is not limited to drills, and appropriate aspects of the invention may be embodied in any other type of electrically powered hand tools, such as a portable miter or chop saw, or an air compressor. As illustrative, non-limiting examples, the security feature may be used in virtually any powered hand tool. Similarly, user-interface 40 (and 40'), battery cord 102 and power supply 118 may be used with any battery-operated hand tool.

Figure 24:
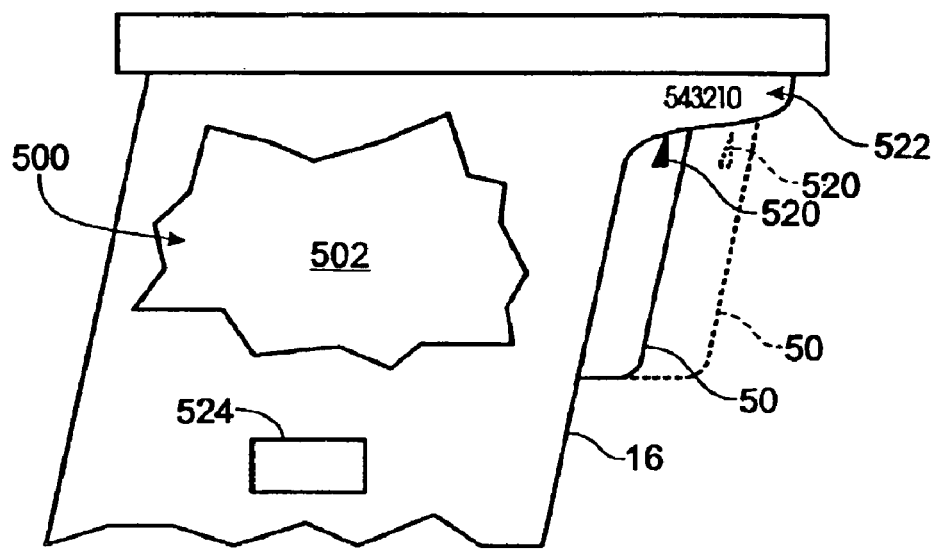
FIG. 24 is a fragmentary side elevation view of a portion of the handle of a tool having a modular control assembly housed at least substantially within the handle.
Figure 25:
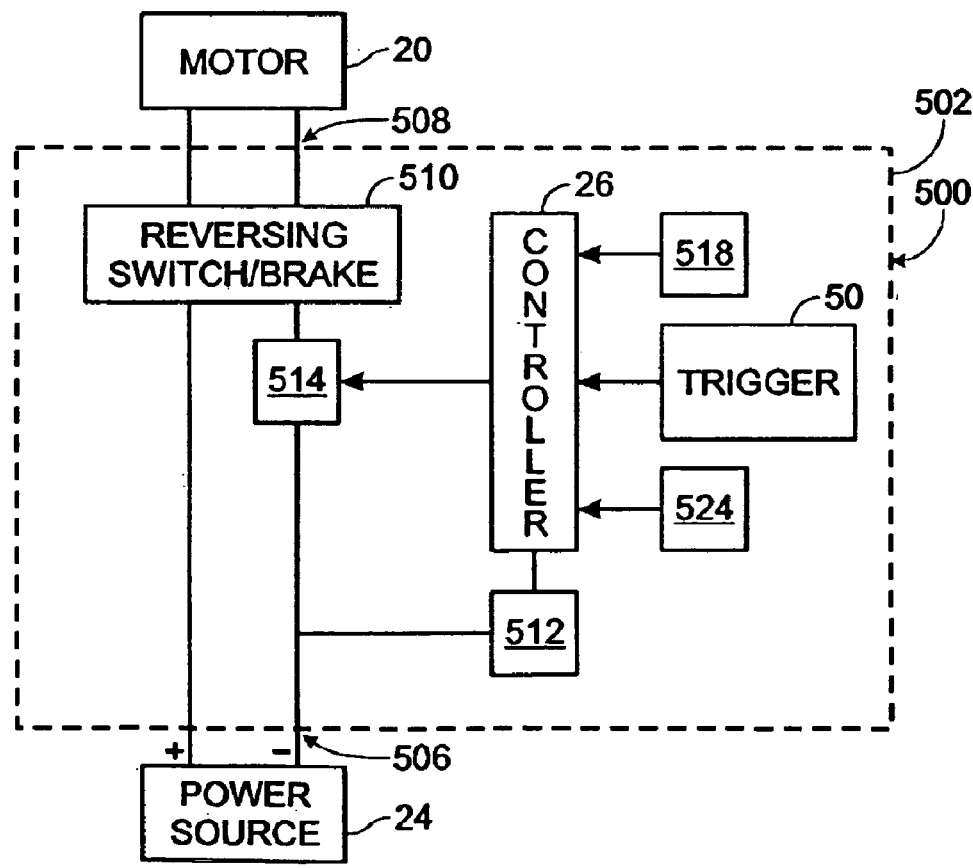
FIG. 25 is a schematic diagram showing the modular control assembly of FIG. 24.

As discussed above, the controller may be located in various positions relative to the tool. For example, it may be positioned anywhere within the housing of the tool, such as within the body or handle, or it may be at least partially separate or separable from the housing of the tool. Another embodiment of the controller is shown in FIGS. 24 and 25. In FIGS. 24 and 25, controller 26 forms part of a modular control assembly, which is generally indicated at 500. Examples of known modular control assemblies are disclosed in U.S. Pat. No. 5,798,584, the disclosure of which is hereby incorporated by reference.

As shown in FIG. 24, control assembly 500 is housed within handle 16, and includes a housing 502 and an actuator, namely trigger 50. As shown, trigger 50 is slidable between a range of positions between an unactuated position (shown in dashed lines) and a fully actuated position (shown in solid lines). It should be understood that a solid-state trigger may be used as well, as previously described herein. Controller 26 and various sensors, switches and other electronics are housed within housing 502. Having the controller and its related sensors, wiring, switches, etc. contained within a discrete modular housing offers the advantage that these components may be more easily protected from damage and contact with dirt, water and other contaminants, as well as facilitating easy assembly. Housing 502 may be waterproof to further protect the control assembly from exposure to water and other liquids, which also enables the tool to be used in wet environments. Furthermore, control assembly 500 may be easily removed and replaced as a unit, without requiring significant disassembly of the tool and without requiring extensive testing to determine what element or subelement of the tool's mechanical and/or electronic system is malfunctioning.

As shown in FIG. 25, control assembly 500 includes an input 506 through which electrical power is delivered from power source 24, such as battery 54, and an output 508 through which the electrical power is delivered to motor 20. Control assembly 500 further includes a reversing switch/electric brake 510, current sensor 512 and a power switch (typically a MOS-FET transistor) 514. Control assembly 500 may also include a high-speed electromechanical bypass 516 operated by depression of trigger 50 to its fully actuated position. Responsive to a signal from trigger 50 and a signal from current sensor 512, controller 26 regulates the flow of electrical power from power source 24 to motor 20 via power switch 514. Reversing switch 510 controls the direction in which motor 20 rotates. The contacts of switch 510 may also be adapted to brake the motor when power is not being supplied, such as by shorting the contacts to the motor. Control assembly 500 may communicate with other sensors external housing 502, such as the previously described depth and position sensors.

In addition to the components described immediately above, control assembly 500 may include many of the features and modes of operation described previously. For example, control assembly 500 may include a further input 518 through which a user interface may communicate with controller 26, such as via a wireless transmitter or patch cord, as previously described with respect to FIG. 5.

A non-limiting example of one of the previously described modes of operation/features that may be implemented and controlled by control assembly 500 is security. The user's passcode may be entered via a user interface, or may be entered via trigger 50. For example, as shown in FIG. 24, trigger 50 includes a position indicator 520, and housing handle 16, or another suitable portion of body 12, assembly 500 or housing 502, includes a series of spaced-apart indicia 522, such as numbers, letters, or other symbols, which may be sequentially selected by the user to enter the user's passcode. As shown, indicia 522 include numbers, and by aligning indicator 520 with a selected number or sequence of numbers, the user may enter a passcode to the controller. When operating in security mode, the controller is preprogrammed to correlate the signal it receives to indicate the relative position of trigger 50, with a stored sequence of positions representative of the user's passcode. For example, from position 0, the user's passcode may be to slide the trigger to 5, 2, 4 then 1. Of course, any number of values may be used in the passcode, and the user may need to return the trigger to position 0 between selected numbers to signal the controller between selected numbers. The previously described audible and other methods of using trigger 50 to enter a passcode may also be used. A microswitch, such as previously described switch 478 may also be included with control assembly 500 to enable the user to enter a passcode via the settings of switches 480.

Control assembly 500 may also include one or more additional switches, dials or other inputs, such as microswitch 524, to allow the user to selectively control the configuration and mode of operation of the tool, as described previously with respect to FIG. 22 to implement such modes of operation as tap mode, step mode, torque mode, trigger mode and push mode. For example, switch 524 may extend through handle 16, or preferably is recessed within handle 16 and covered by a cover that may be selectively opened by the user when the user desired to manipulate the switch and/or any other dials and controls protected by the cover.

By turning back to FIG. 28, several other features of the invention are shown on a tool 610. It should be understood that any of the features shown in FIG. 27 may be incorporated into a tool individually, together, or in combination with one or more of the other features disclosed herein. The features in FIG. 27 are being illustrated together for purposes of brevity.

Besides the previously discussed security indicia 562, security station 570, and waterproof battery connection 590, tool 610 also includes a chuck 612 that is at least substantially housed within the body 614 of the tool. Unlike conventional keyless chucks, such as shown in FIG. 1, which are manually opened and closed about a bit and which extend at least substantially in front of the body of the tool, chuck 612 is at least substantially housed within body 614. As such, chuck 612 is shielded from being damaged and also is prevented from damaging objects when the tool is used. Conventional exposed chucks may scratch or otherwise damage adjacent objects if those objects are contacted by the rotating chuck. Also, because the chuck is housed within body 614, it does not require the external shell required on exposed chucks, thereby making it less expensive to manufacture. To provide the user with additional gripping surface area for manually operating the chuck, the external shell is also generally larger then required simply to house the mechanical components of a chuck. In the embodiment of the present invention utilizing an internal chuck, this larger shell is unnecessary and can be eliminated, thereby making the operating end of the drill more compact.

Chuck 612 includes an internal control ring (not shown) that rotates relative to the chuck to open or close the jaws of the chuck. Details of suitable construction for a such a chuck are shown in U.S. Pat. No. 5,452,906, which is incorporated herein by reference. The internal control ring would correspond to split nut 38, shown FIG. 2 of that patent, and possibly a small shell to retain the halves of the split nut. However, the shell can be relatively small since it does not have to be large enough to be comfortably operated by a users hand. A chuck hold device 154, such as disclosed with respect to the drill shown in FIGS. 8–10, is used to selectively prevent the control ring from rotating with the chuck. Chuck hold 154 includes an actuator 616, such as a button or switch on the body of the tool. Two illustrative examples of suitable positions for actuator 616 are shown in FIG. 27, however, it is within the scope of the invention that other positions and forms of actuators may be used. When the actuator is pressed, a member engages the control ring to prevent further rotation relative to the housing. With the control ring fixed relative to the housing, any operation of the motor drives the jaws of the chuck in or out. Thus, the user uses the trigger and forward and reverse switch to control opening and closing of the jaws of the chuck. Another advantage of this system is that the user can press the actuator and trigger with one hand to thereby allow one-handed loading or unloading of the chuck. This frees the other hand to stabilize the tool being engaged by the chuck.

Figure 34:
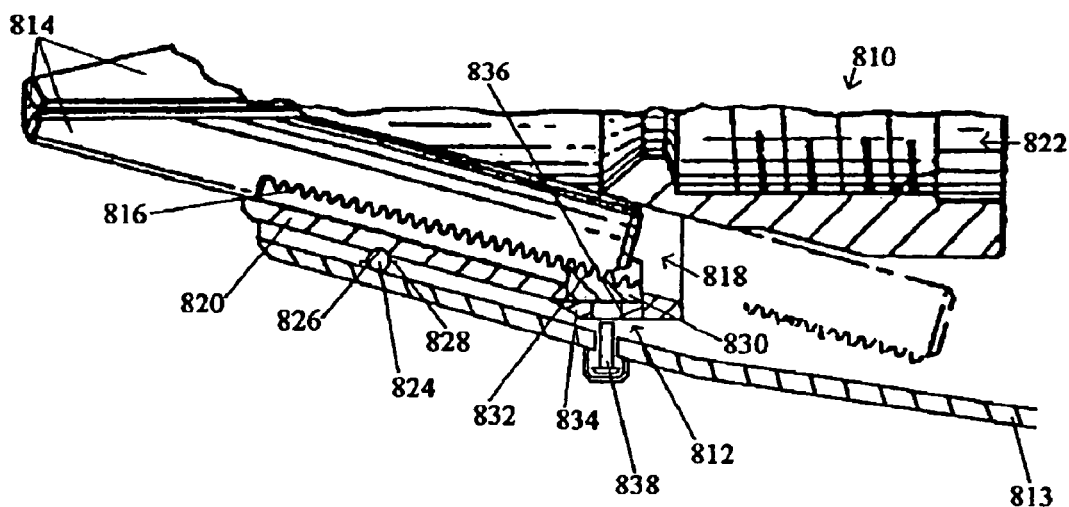
FIG. 34 shows a portion of a drill with an internally operated chuck according to the present invention.

An example of a chuck 810 with an internal control ring 812 is illustrated in FIG. 34. Chuck 810 fits into a drill housing 813 and includes jaws 814 spaced around the axis of the chuck. Each jaw includes a threaded region 816 on its surface. The threaded region is preferably very fine, i.e. greater than twenty threads per inch, to provide good mechanical advantage when closing the jaws, although it is within the scope of the invention that the number of threads per inch may be greater or fewer than the example given above. The jaws are slideably received into bores, such as bore 818, formed in chuck body 820. The chuck body includes a socket 822 at the back to engage the output of the drill's gearbox. The outer end of the chuck may be supported in the housing by a set of bearings 824. The bearings run in a groove, or race, 826 formed in the outer surface of the body and are held at spaced-apart intervals by a bearing guide 828. Depending on the rigidity of the various components of the drill, it may or may not be necessary to provide this support. Furthermore, as described below, the housing need not extend to the end of the chuck.

Control ring 812 includes a pair of split nuts 830 that fit around the chuck body and include female threads 832 to engage threaded region 816 on jaws 814. The control ring also includes a retainer band 834 that is press fit, or otherwise suitably retained, around the split nuts to hold them together. The retainer band includes a plurality of circumferential holes 836 to engage a button actuator 838. When the button actuator is pushed, it fits into one of the holes and prevents the control ring from rotating with the chuck relative to the drill housing. When the motor is operated to rotate the chuck in this configuration, the rotation of the control ring over the jaws drives the jaws open or closed depending on the direction of rotation. It should be understood that any other suitable mechanism may be used for selectively preventing rotation of the control ring with the chuck. Examples of other suitable mechanisms are disclosed herein with respect to the drill shown in FIGS. 8–10.

Figure 35:
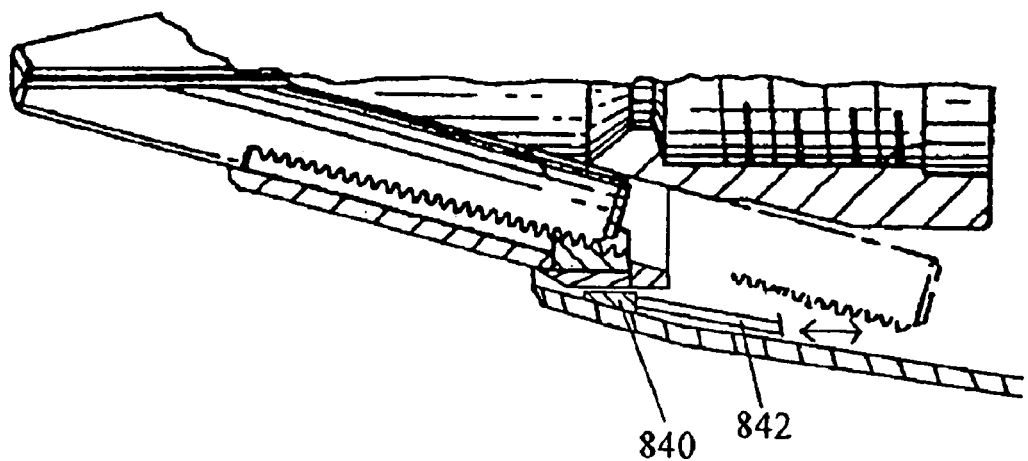
FIG. 35 shows an alternative configuration of the internally operated chuck of FIG. 34.

An alternative embodiment of this chuck is shown in FIG. 35. In FIG. 35, the external surface of the retainer band is serrated like the teeth of a gear. A portion of the opposing internal surface of the housing is similarly serrated. The actuator, such as shown at 616, is operatively coupled to a pushrod 842. When actuator 616 is acted upon by the user, it drives a cam 840, via pushrod 842, into the region between the housing and the control ring. The cam includes externally serrated surfaces that engage the corresponding surfaces of the housing and the control ring to prevent the control ring from rotating relative to the housing. The actuator is preferably elastically biased to withdraw the cam when the user releases the actuator, thereby freeing the control ring to rotate with the chuck. It should be noted that while the drill housing is shown terminating near the control ring in this embodiment, it could extend partially or all the way to the end of the chuck. Moreover, provided that some mechanism is provided to engage the control ring, it is not required that the housing cover any portion of the chuck. It may be desirable to limit the torque applied to the chuck during use of the internal control ring to prevent damage to the chuck if too much torque is available. This can be accomplished by providing a switch operated by the actuator to signal the controller to limit motor current and thereby torque.

Figure 36:
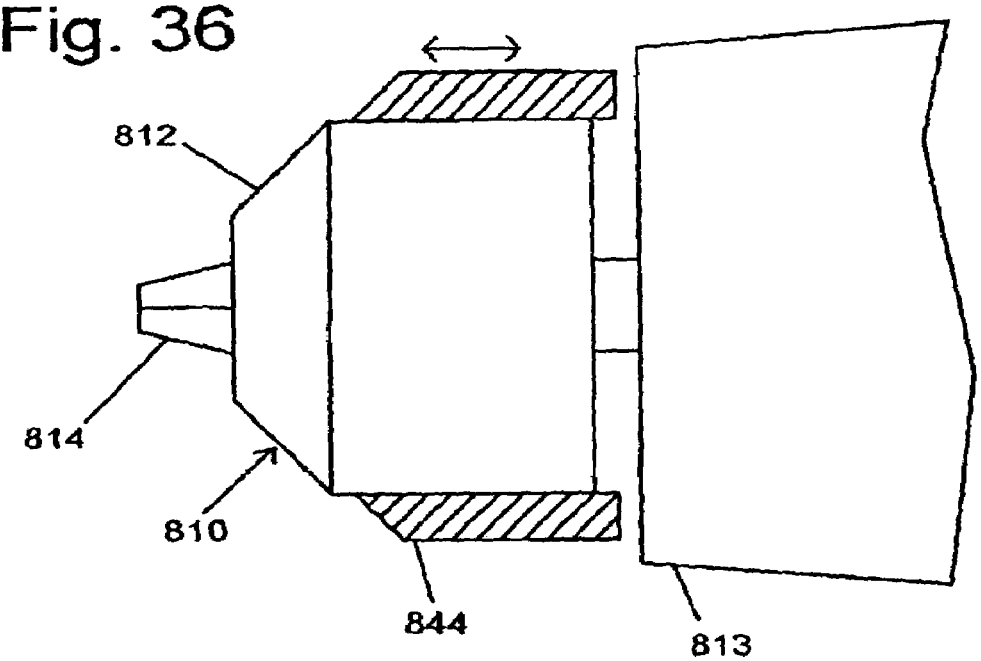
FIG. 36 shows an alternative chuck configuration.

As another variation shown in FIG. 36, the control ring can be provided with a partially telescoping shell 844. An exterior portion of the shell is provided with serrations that engage corresponding structure formed on the front of the housing. By sliding the shell back against the housing, torque from the housing is transferred to the shell to prevent the control ring from rotating. The shell is preferably spring biased to return to the disengaged position when released by the user. Similarly, the forward portion of the housing can be provided with a portion that can be extended selectively engage a portion of the rear surface of the control ring, even where the housing does not envelope any portion of the chuck. The engagement between the shell/control ring and the housing can take the form of a frictional connection, teeth which are sloped to transfer a given amount of torque proportional to the pressure exerted between the shell/control ring and the housing, or an interlocking connection, where the shell/control ring is locked to the housing independent of pressure applied. Square castellations or teeth on the rear face of the shell/control ring and forward face of the housing could be used to provide an interlocking connection. Alternatively, the housing could telescope over an irregularly shaped portion at the rear perimeter of the shell/control ring to provide an interlocked connection.

It should be noted that the internal chuck design is also particularly suitable for use with the previously described palm drill configuration shown in FIGS. 8–10. As with the drill of FIG. 27, the housing of the palm drill embodiments can be extended forward to envelope the chuck. As described above, this arrangement can be used to reduce the profile of the drill because the user operable rings or shells on the chuck are no longer necessary. These embodiments of chuck may also be incorporated into right angle drills.

When a shielded chuck 612 is used, it may also be desirable to locate at least one of the previously described position sensors 42 near the leading edge of the body, which in this embodiment is also proximate the leading edge of the chuck. In this position, the sensor will be much closer to the axis of rotation and thereby much less susceptible to parallax errors in measuring distance as can occur with a single sensor positioned off-axis measuring to an angled surface. This allows more accurate measurement of distance without requiring multiple sensors to account for tipping of the drill relative to the work surface.

When the tool shown in FIGS. 8–10 was discussed, it was also discussed that the force transducer 219 disclosed in those figures may be incorporated with any of the other embodiments of the invented tool disclosed herein. An example of such a transducer 219 used with tool 610 is shown in FIG. 27, in which the transducer is positioned between the tool's motor 20 and gear box assembly 618, with the gear box assembly axially slidable but rotationally fixed with respect to the motor. As shown, the output shaft 620 of the motor extending through a passage in the transducer. When the user applies force to the drill along the axis of the chuck, this force is transmitted through gear box assembly 618 to transducer 219, which communicates this force to the controller 26 (not shown).

As discussed with respect to FIGS. 1 and 4, the handle and/or the battery may be detached from the body of the tool while remaining in electrical communication therewith to permit operation of the tool without having to support the entire weight of the tool in one hand. When the tool is used in this configuration, it may also be desirable to be able to selectively stow the tool when not being used. In FIG. 27, a retainer is shown on the body of the tool and generally indicated at 622. There may also be a similar retainer on the opposite side of the housing. Retainer may be any suitable device for removably securing the tool to the user's belt, clothing, etc. Examples of suitable retainers are clips, such as shown with respect to battery 54 in FIG. 4, and hook and loop fasteners. It should be remembered that with the significant weight of the battery separated from the body of the tool, the remaining portion of the tool is relatively lightweight. Therefore, retainers that previously could not support the weight of a tool and its battery may now be used.

In FIG. 27, it can also be seen that the trigger differs from the trigger shown in FIGS. 1 and 4. In FIG. 27, the trigger is generally indicated at 630. Trigger 630 actually includes a pair of triggers 632 and 634. As shown, the lower trigger 634, referred to herein as a secondary trigger, includes a portion 636 that is nested with primary trigger 632 so that actuation of primary trigger 632 will also actuate the secondary trigger. However, the secondary trigger may also be actuated independent of the primary trigger. When the triggers are nested together, as described above, actuation of the secondary trigger along with the primary trigger produces the same result as if only the primary trigger was actuated. The nesting, or interlocking, described above enables the user to not have to precisely position the user's finger to actuate only the primary trigger. Precise placement is only required for the secondary, less-frequently used, trigger. It is within the scope of the present invention that both triggers may be separately actuated independent of each other, and that actuation of both triggers simultaneously could signal the controller to actuate a third feature or mode of operation separate from the mode for which the first and second triggers are configured.

Having dual triggers enables two of the above-described modes of operation to be configured and selectively used without having to reconfigure the tool. For example, the primary trigger may be configured to function like a conventional trigger on a drill, while the secondary trigger may be configured to actuate one of the versions of step mode described herein. Other combinations include one trigger controlling speed and the other controlling torque, one configured to control speed, torque, or the step and the other configured for tap mode, and both triggers configured for different step modes. Furthermore, the primary trigger could control forward rotation, while the other trigger controls reverse.

While the invention has been disclosed in its preferred form, the specific embodiments thereof as disclosed and illustrated herein are not to be considered in a limiting sense as numerous variations are possible. Applicants regard the subject matter of the invention to include all novel and non-obvious combinations and subcombinations of the various elements, features, functions and/or properties disclosed herein. No single feature, function, element or property of the disclosed embodiments is essential to all embodiments of the invention. The following claims define certain combinations and subcombinations which are regarded as novel and non-obvious. Other combinations and subcombinations of features, functions, elements and/or properties may be claimed through amendment of the present claims or presentation of new claims in this or a related application. Such claims, whether they are different, broader, narrower or equal in scope to the original claims, are also regarded as included within the subject matter of applicants' invention.

We claim:

1. An electrically powered hand drill/driver, comprising:
   a rotatable work element adapted to receive a bit;
   a motor adapted to drive the rotation of the work element during powered operation of the drill\driver;
   a body having a housing containing at least the motor and a handle adapted to be gripped by a user while operating the drill/driver;
   a power source adapted to deliver power to the motor;
   at least one user input; wherein the at least one user input includes a trigger adapted to be depressed by a user to select powered operation of the drill/driver; and
   an electronic motor controller electrically connected to the power source and the motor and configured to regulate rotation of the work element by controlling delivery of power to the motor from the power source, wherein the motor controller is adapted to be selectively configured between a plurality of operating modes, wherein the plurality of operating modes include an operating mode in which the motor controller is adapted to cause less than one revolution of rotation by the work element upon depression of the trigger.

2. The drill/driver of claim 1, wherein the motor controller is adapted to cause sequential further rotation of the work element of less than one revolution upon sequential release and depression of the trigger.

3. The drill/driver of claim 1, wherein upon continued depression of the trigger and completion of the less than one revolution of rotation by the work element, the motor controller is adapted to cause at least one additional rotation of the work element of less than one revolution, and further wherein the at least one additional rotation of the work element is preceded by a period in which the work element is not rotating.

4. The drill/driver of claim 3, wherein the motor controller is adapted to precede the at least one additional rotation of the work element by a period in which the work element is not rotating and the trigger remains depressed.

5. The drill/driver of claim 3, wherein the motor controller is adapted to precede the at least one additional rotation of the work element by a period in which the work element is not rotating and the trigger is released and then depressed.

6. The drill/driver of claim 1, wherein the plurality of operating modes include a second operating mode in which the controller causes continuous rotation of the work element responsive to continued depression of the trigger.

7. The drill/driver of claim 6, wherein the motor controller is further adapted to interrupt the continuous rotation of the work element if a predetermined torque threshold is reached.

8. The drill/driver of claim 1, wherein the handle includes a base, wherein the power source includes a rechargeable battery, and further wherein the power source is adapted to be coupled to the base of the handle.

9. The drill/driver of claim 1, wherein the drill/driver further includes a user interface having a display adapted to display information to a user about the operating mode of the motor controller.

10. The drill/driver of claim 9, wherein the user interface includes a plurality of user input controls in communication with the controller, and further wherein the motor controller is adapted to transition between the plurality of operating modes responsive at least in part to inputs from the plurality of user input controls.

11. An electrically powered hand drill/driver, comprising:
a rotatable work element adapted to receive a bit;
a motor adapted to drive the rotation of the work element during powered operation of the drill\driver;
a body having a housing containing at least the motor and a handle adapted to be gripped by a user while operating the drill/driver;
a power source adapted to deliver power to the motor;
at least one user input; wherein the at least one user input includes a trigger adapted to be depressed by a user to select powered operation of the drill/driver; and
an electronic motor controller electrically connected to the power source and the motor and configured to regulate rotation of the work element by controlling the delivery of power to the motor from the power source, wherein the controller is configured to receive a signal when the trigger is depressed, and upon receipt of the signal from the trigger, the controller causes a predetermined number of torque impulses to be incrementally applied to the work element.

12. The drill/driver of claim 11, wherein the predetermined number of torque impulses correspond to at least one revolution of the work element.

13. The drill/driver of claim 11, wherein the predetermined number of torque impulses correspond to less than one revolution of the work element.

14. The drill/driver of claim 11, wherein the drill/driver includes a user interface having at least one user input control in communication with the motor controller, and further wherein the predetermined number of torque impulses are determined responsive at least in part to user inputs to at least one user input control.

15. The drill/driver of claim 11, wherein the motor controller is adapted to cause sequential delivery of a further predetermined number of torque impulses to the work element upon sequential release and depression of the trigger.

16. The drill/driver of claim 11, wherein upon continued depression of the trigger and delivery of the predetermined number of torque impulses to the work element, the motor controller is adapted to cause the delivery of at least one additional predetermined number of torque impulses to the work element after a period in which the work element is not rotating.

17. The drill/driver of claim 16, wherein the motor controller is adapted to precede the delivery of the at least one additional predetermined number of torque impulses to the work element by a period in which the work element is not rotating and the trigger remains depressed.

18. The drill/driver of claim 16, wherein the motor controller is adapted to precede the delivery of the at least one additional predetermined number of torque impulses to the work element by a period in which the work element is not rotating and the trigger is released and then depressed.

19. The drill/driver of claim 11, wherein the handle includes a base, wherein the power source includes a rechargeable battery, and further wherein the power source is adapted to be coupled to the base of the handle.

20. The drill/driver of claim 11, further comprising a user interface with an electronic display and at least one user input control.

* * * * *